(12) United States Patent
Traister et al.

(10) Patent No.: US 7,444,462 B2
(45) Date of Patent: *Oct. 28, 2008

(54) METHODS FOR PHASED GARBAGE COLLECTION USING PHASED GARBAGE COLLECTION BLOCK OR SCRATCH PAD BLOCK AS A BUFFER

(75) Inventors: Shai Traister, Sunnyvale, CA (US); Jason Lin, Santa Clara, CA (US)

(73) Assignee: SanDisk Corporation, Milpitas, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 11/541,035

(22) Filed: Sep. 28, 2006

(65) Prior Publication Data

US 2008/0086619 A1 Apr. 10, 2008

(51) Int. Cl.
*G06F 12/00* (2006.01)
(52) U.S. Cl. .................. 711/103; 711/154; 711/165
(58) Field of Classification Search .................. None
See application file for complete search history.

(56) References Cited

U.S. PATENT DOCUMENTS

| | | | | |
|---|---|---|---|---|
| 5,640,529 | A | 6/1997 | Hasbun | 711/103 |
| 6,510,440 | B1 | 1/2003 | Alpern et al. | 707/206 |
| 6,792,601 | B1 | 9/2004 | Dimpsey et al. | 718/102 |
| 7,114,045 | B1 | 9/2006 | Pliss et al. | 711/159 |
| 7,287,049 | B1 | 10/2007 | Printezis et al. | 707/206 |
| 2001/0023472 | A1 | 9/2001 | Kubushiro et al. | 711/103 |
| 2005/0141312 | A1 | 6/2005 | Sinclair | |
| 2006/0161724 | A1 | 7/2006 | Bennett | 711/103 |
| 2006/0161728 | A1 | 7/2006 | Bennett | |
| 2007/0033324 | A1 | 2/2007 | Sinclair | 711/103 |
| 2008/0034174 | A1 | 2/2008 | Traister et al. | 711/159 |
| 2008/0034175 | A1 | 2/2008 | Traister et al. | 711/103 |
| 2008/0082596 | A1 | 4/2008 | Gorobets | 711/103 |
| 2008/0082728 | A1 | 4/2008 | Traister et al. | 711/159 |
| 2008/0082775 | A1 | 4/2008 | Gorobets | 711/159 |
| 2008/0091872 | A1 | 4/2008 | Bennett et al. | 711/103 |

FOREIGN PATENT DOCUMENTS

| | | |
|---|---|---|
| WO | WO2005/045683 | 5/2005 |
| WO | WO2006/065655 | 6/2006 |

OTHER PUBLICATIONS

PCT "International Search Report and Written Opinion" mailed Jun. 3, 2008 in related International Application No. PCT/US2007/078836.
USPTO Notice of Allowance and Fee(s) Due mailed Jul. 1, 2008, 2008 in U.S. Appl. No. 11/499,606.
USPTO Notice of Allowance and Fee(s) Due mailed Jun. 23, 2008, 2008 in U.S. Appl. No. 11/499,598.
USPTO Notice of Allowance and Fee(s) Due mailed Aug. 6, 2008 in U.S. Appl. No. 11/540,778.
USPTO Notice of Allowance and Fee(s) Due mailed Aug. 8, 2008 in U.S. Appl. No. 11/541,371.
USPTO Notice of Allowance and Fee(s) Due mailed Jul. 16, 2008 in U.S. Appl. No. 11/541,012.

*Primary Examiner*—Jack A Lane
(74) *Attorney, Agent, or Firm*—Weaver Austin Villeneuve Sampson LLP

(57) ABSTRACT

A method for phased garbage collection is provided. In this method, a write command is received to write data. The write command is allocated a timeout period to complete an execution of the write command. Thereafter, a busy signal is asserted and a portion of a garbage collection operation is performed for a garbage collection time period. The data are written to a block and the busy signal is released before the timeout period.

24 Claims, 16 Drawing Sheets

METHODS FOR PHASED GARBAGE COLLECTION USING PHASED GARBAGE COLLECTION BLOCK OR SCRATCH PAD BLOCK AS A BUFFER

CROSS-REFERENCES TO RELATED APPLICATIONS

This application is related to U.S. patent application Ser. No. 11/541,012, filed on Sep. 28, 2006, and entitled "Memory Systems for Phased Garbage Collection Using Phased Garbage Collection Block or Scratch Pad Block as a Buffer;" is related to U.S. patent application Ser. No. 11/040,325, filed on Jan. 20, 2005, and entitled "Scheduling of Housekeeping Operations in Flash Memory Systems;" is related to U.S. application Ser. No. 11/499,606, filed on Aug. 4, 2006, and entitled "Methods for Phased Garbage Collection;" and is related to U.S. patent application Ser. No. 11/499,598, filed on Aug. 4, 2006, and entitled "Non-Volatile Memory Storage Systems for Phased Garbage Collection," the disclosures of which are incorporated herein by reference.

FIELD OF THE INVENTION

The present invention relates generally to memory operations and, more particularly, to methods and systems for performing phased garbage collection operations.

BACKGROUND

In non-volatile memory storage systems, blocks of data stored in the memory are periodically garbage collected (i.e., compacted or consolidated) to reclaim a memory's storage capacity. In a typical garbage collection operation, valid data from a block are copied to another block. After the valid data are transferred, the original block is erased to provide storage capacity. Currently, a write operation can trigger a non-volatile memory storage system to perform a garbage collection operation. The host allows a fixed amount of time for the execution of the write operation, which includes the garbage collection operation, if triggered. For example, the Secure Digital protocol limits the amount of time to 250 milliseconds. A timeout error can result if the non-volatile memory storage system exceeds this fixed amount of time in a write operation.

The sizes of memory blocks have been increasing due to increased capacity, higher parallelism, and die size scaling. Accordingly, executions of write operations are taking longer because more data are transferred. A garbage collection operation can therefore easily exceed the fixed amount of time allocated to the write operation. As a result, there is a need to prevent the timeout errors when the amount of time to perform a garbage collection operation exceeds the fixed amount of time.

SUMMARY

Various embodiments of the present invention provide methods and/or systems for phased garbage collection operations. It should be appreciated that the embodiments can be implemented in numerous ways, including as a method, a circuit, a system, or a device. Several embodiments of the present invention are described below.

In an embodiment, a method for phased garbage collection is provided. In this method, a write command is received to write data. The write command is allocated a timeout period to complete an execution of the write command. Thereafter, a busy signal is asserted and a portion of a garbage collection operation is performed for a garbage collection time period. The data are written to a block and the busy signal is released before the timeout period.

Other embodiments and advantages of the invention are apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

A detailed description of one or more embodiments is provided below along with accompanying figures. The detailed description is provided in connection with such embodiments, but is not limited to any particular embodiment. The scope is limited only by the claims and numerous alternatives, modifications, and equivalents are encompassed. Numerous specific details are set forth in the following description in order to provide a thorough understanding. These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

The embodiments described herein provide methods and/or systems for phased garbage collection. In general, a garbage operation can be split into multiple phases. The phases (or portions) of the garbage collection operation can be performed over multiple timeout periods. As will be explained in more detail below, a portion of a garbage collection operation is performed within one timeout period and the data received from the write command may be stored in a phased garbage collection block or a scratch pad block.

Figure 1:
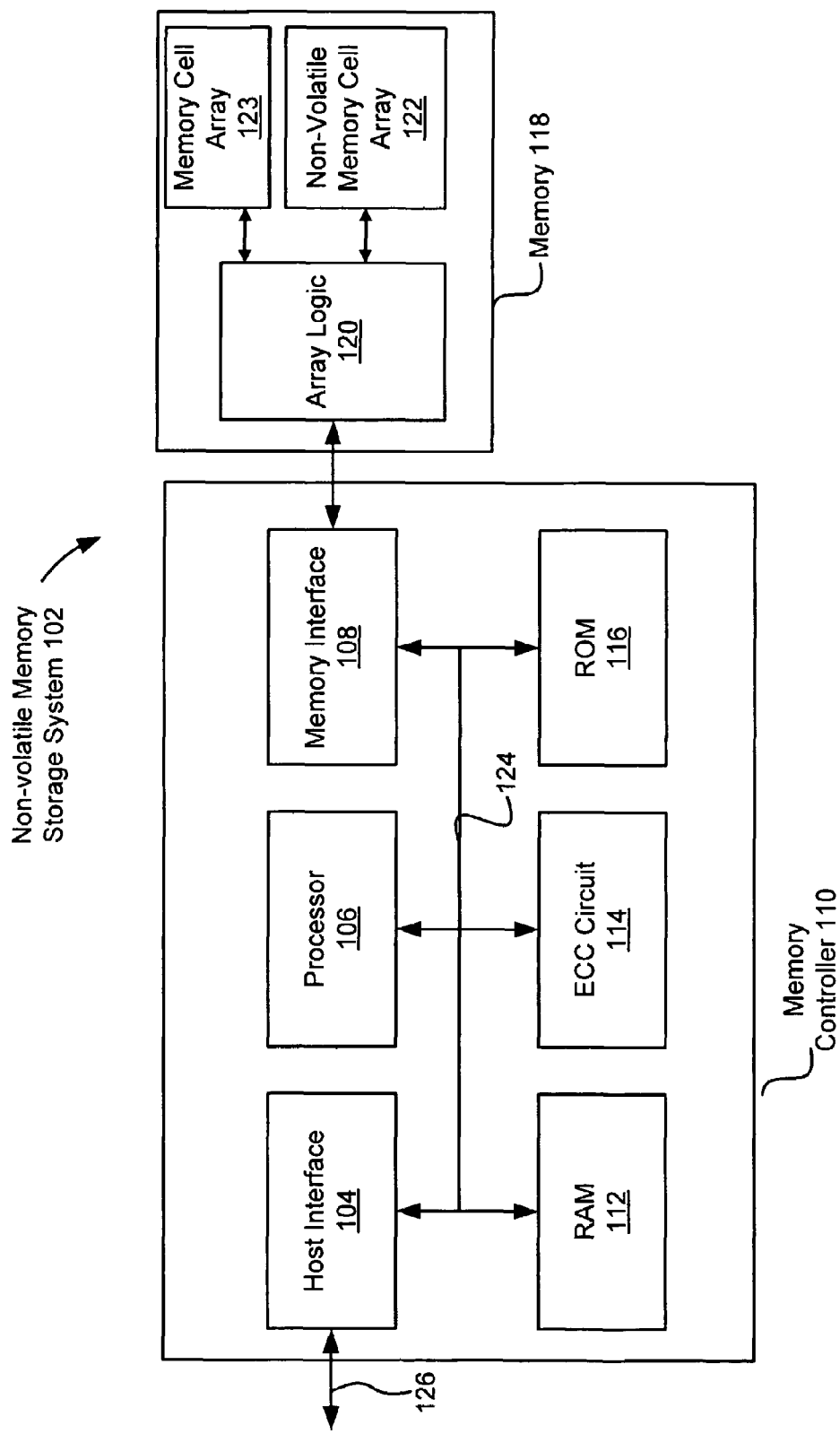
FIG. 1 is a simplified block diagram of an example of a non-volatile memory storage system, in accordance with an embodiment of the present invention.

FIG. 1 is a simplified block diagram of an example of a non-volatile memory storage system, in accordance with an embodiment of the present invention. A host system (e.g., desktop computers, audio players, digital cameras, and other computing devices) may write data to and read data from non-volatile memory storage system 102. Non-volatile memory storage system 102 may be embedded within the host or removably connected to the host. As shown in FIG. 1, non-volatile memory storage system 102 includes memory controller 110 in communication with memory 118. In general, memory controller 110 controls the operation of memory 118. Examples of operations include writing (or programming) data, reading data, erasing data, verifying data, attending to garbage collection operations, and other operations. Memory controller 110 includes bus 124 that interfaces with system bus 126 through host interface 104 and the memory controller interfaces with memory 118 through memory interface 108. Host interface 104, processor 106 (e.g., microprocessor, microcontrollers, and other processors), memory interface 108, random access memory (RAM) 112, error correcting code (ECC) circuit 114, and read-only memory (ROM) 116 are in communication by way of bus 124. ROM 116 can store a storage system firmware that includes program instructions for controlling the operation of memory 118. Processor 106 is configured to execute the program instructions loaded from ROM 116. The storage system firmware may be temporarily loaded into RAM 112 and additionally, the RAM may be used to buffer data that are transferred between a host and memory 118. ECC circuit 114 can check for errors passing through memory controller 110 between the host and memory 118. If errors are found, ECC circuit 114 can correct a number of error bits, the number depending on the ECC algorithm utilized.

Memory 118 can include array logic 120, non-volatile memory cell array 122, and memory cell array 123. Non-volatile memory cell array 122 may include a variety of non-volatile memory structures and technologies. Examples of non-volatile memory technologies include flash memories (e.g., NAND, NOR, Single-Level Cell (SLC/BIN), Multi-Level Cell (MLC), Divided bit-line NOR (DINOR), AND, high capacitive coupling ratio (HiCR), asymmetrical contact-less transistor (ACT), and other flash memories), erasable programmable read-only memory (EPROM), electrically-erasable programmable read-only memory (EEPROM), read-only memory (ROM), one-time programmable memory (OTP), and other memory technologies.

In an embodiment, memory 118 may additionally include memory cell array 123 that is configured to store a buffer. The buffer is configured to store data in a phased garbage collection operation. As will be explained in more detail below, in a phased garbage collection operation, new data received from a write command can be stored in the buffer. It should be appreciated that the buffer also may be located in RAM 112 or in non-volatile memory cell array 122, in accordance with embodiments of the present invention. Similar to non-volatile memory cell array 122, memory cell array 123 may include a variety of memory structures and technologies. Since memory cell array 123 is configured for buffering operations, the memory cell array may incorporate a different memory structure or use different parameters that may be faster, more economical, and more reliable than non-volatile memory array 122.

Array logic 120 interfaces memory controller 110 with non-volatile memory cell array 122 and memory cell array 123 and can provide, for example, addressing, data transfer and sensing, and other memory support to the non-volatile memory cell array and the memory cell array. To support non-volatile memory cell array 122 and memory cell array 123, array logic 120 can include row decoders, column decoders, charge pumps, word line voltage generators, page buffers, input/output buffers, address buffers, and other circuitries.

Figure 2:
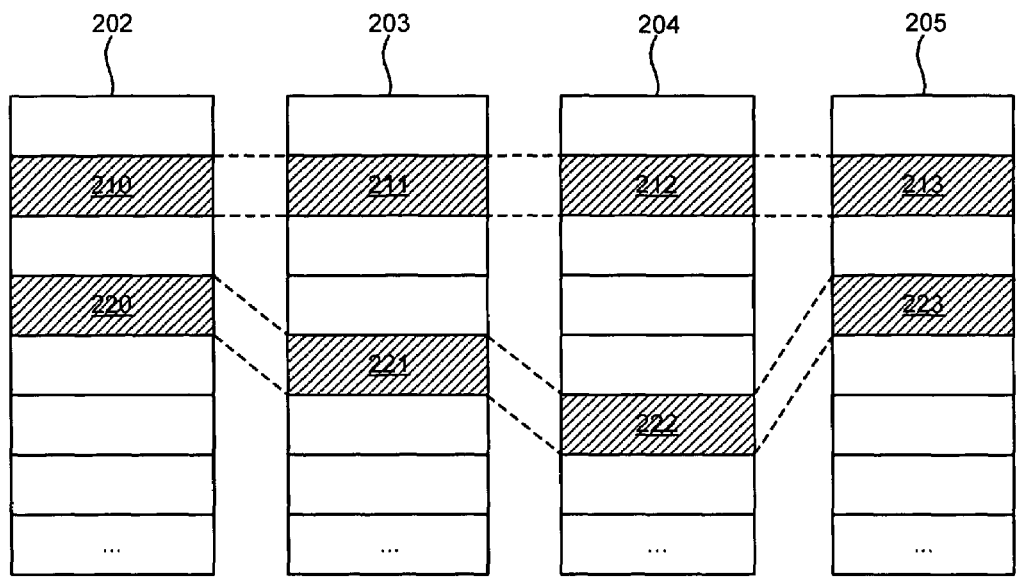
FIG. 2 is a simplified block diagram of an organization of the memory cell array into planes.

FIG. 2 is a simplified block diagram of an organization of the memory cell array into planes. One or more memory cell arrays may be divided into multiple planes or sub-arrays. In the example of FIG. 2, a memory cell array is divided into four planes 202-205. It should be appreciated that other number of planes, such as 1, 2, 8, 16, or more, can exist in a non-volatile memory storage system. Each plane 202, 203, 204, or 205 may be divided into blocks of memory cells, such as blocks 210-213 and 220-223, located in respective planes 202-205. A block of memory cells is the smallest number of memory cells that are physically erasable together. For increased parallelism, the blocks can be operated in larger metablock units where one block from each plane 202, 203, 204, or 205 is logically linked together to form a metablock. For example, four blocks 210-213 can be logically linked together to form a metablock. Further, the blocks used to form a metablock can be from various locations within their respective planes, such as planes 202-205. For example, four blocks 220-223 from various locations within their respective planes 202-205 can be logically linked together to form another metablock. A metablock may extend across all four logical planes 202-205 within the non-volatile memory storage system or the non-volatile memory storage system can dynamically form metablocks from one or more blocks in one or more different planes.

Figure 3:
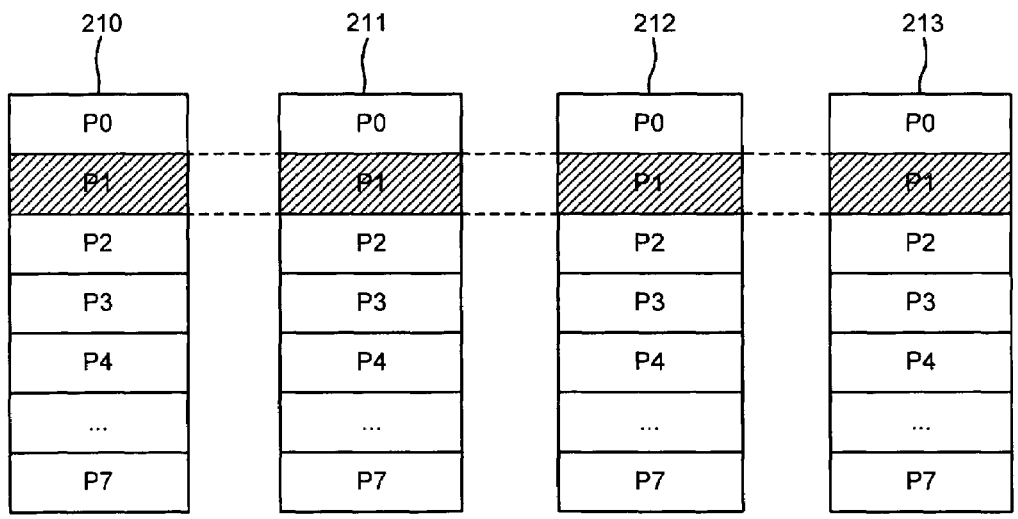
FIG. 3 is a simplified block diagram of pages of memory cells.

FIG. 3 is a simplified block diagram of pages of memory cells. Each block, such as blocks 210-213, is further divided into pages of memory cells. As shown in FIG. 3, each block 210, 211, 212, or 213 is divided into eight pages P0-P7. Alternatively, there can be 16, 32, or more pages of memory cells within each block 210, 211, 212, or 213. To increase the operational parallelism of the non-volatile memory storage system, the pages within two or more blocks may be logically linked into metapages. For example, a metapage can be formed of one page, such as P1, from each of four blocks 210-213. A metapage can extend across all planes within the non-volatile memory storage system or the non-volatile memory storage system can dynamically form metapages from one or more pages in one or more separate blocks in one or more different planes.

Figure 4:
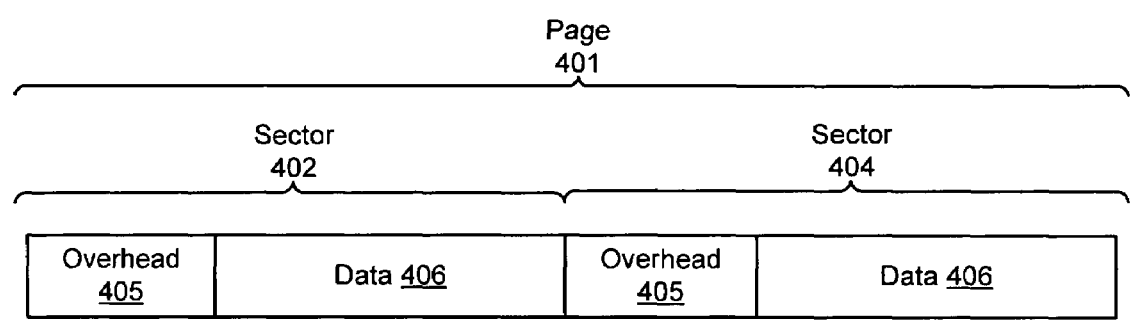
FIG. 4 is a simplified block diagram of sectors of memory cells.

FIG. 4 is a simplified block diagram of sectors of memory cells. A page can be further divided into one or more sectors. The amount of data in each page can be an integer number of one or more sectors of data, where each sector may store 512 bytes of data. FIG. 4 shows page 401 divided into two sectors 402 and 404. Each sector 402 or 404 contains data 406, which can be 512 bytes in size, and overhead data 405 associated with the data. The size of overhead data 405 can be 16 bytes and can store, for example, an ECC calculated from data 406 during programming, the logical address associated with the data, a count of the number of times the block has been erased and re-programmed, control flags, operating voltage levels, and other information associated with the data.

Figure 5:
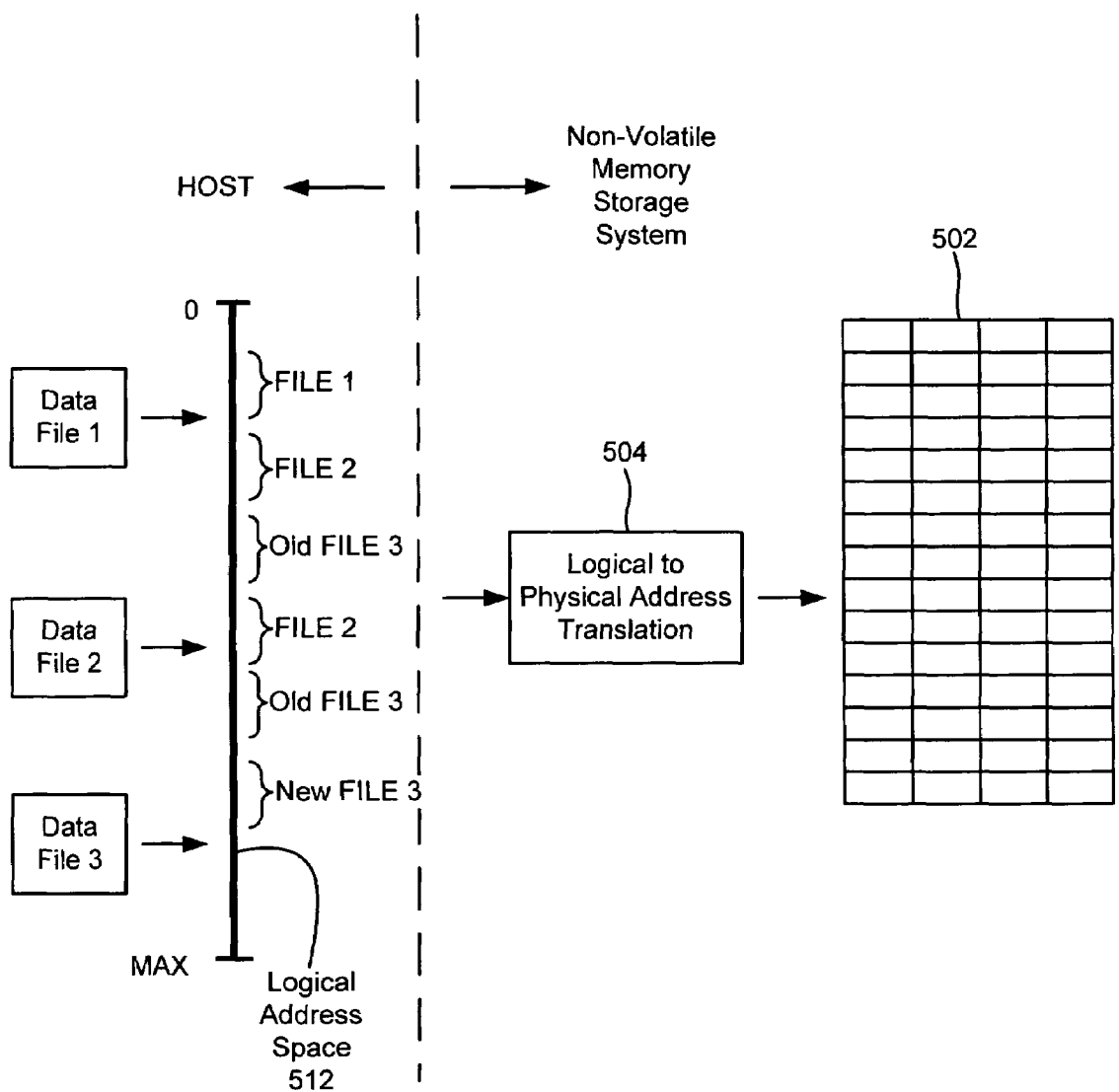
FIG. 5 is a simplified block diagram of a logical interface between a host and a non-volatile memory storage system.

FIG. 5 is a simplified block diagram of a logical interface between a host and non-volatile memory storage system. A continuous logical address space 512 provides addresses for data that can be stored in memory. Logical address space 512 as viewed by the host can be divided into increments of clusters of data. Each cluster may include a number of sectors of data, such as between 4 and 64 sectors.

As shown in FIG. 5, an application program executed on the host creates three data files 1, 2, and 3. Files 1, 2, and 3 can be an ordered set of data and are identified by a unique name or other reference. The host assigns a logical address space to file 1 that is not already located to other files. Here, file 1 is shown to have been assigned a continuous range of available logical addresses.

When host creates file 2 after file 1, the host similarly assigns two different ranges of continuous addresses within logical address space 512. Host may not assign a continuous logical address to a file, such as file 1, 2, or 3, but can rather assign fragments of logical addresses in between logical address ranges already allocated to other files. The example of FIG. 5 shows that another file 3 is allocated a non-continuous address range within logical address space 512, which is not previously allocated to files 1 and 2 and other data.

The host can keep track of logical address space 512 by maintaining a file allocation table (FAT), where the logical addresses assigned by the host to the various data files, such as files 1-3, by conversion are maintained. The host references files 1-3 by their logical addresses and not by the physical locations where the non-volatile memory storage system stores the files. On the other hand, the non-volatile memory storage system references files 1-3 by portions of the logical addresses to which data have been written and does not reference the files by the logical addresses allocated to the files. The non-volatile memory storage system converts the logical addresses provided by the host into unique physical addresses within memory cell array 502 where data from the host are stored. Block 504 represents a table of these logical-to-physical address conversions, which is maintained by the non-volatile memory storage system.

Figure 6:
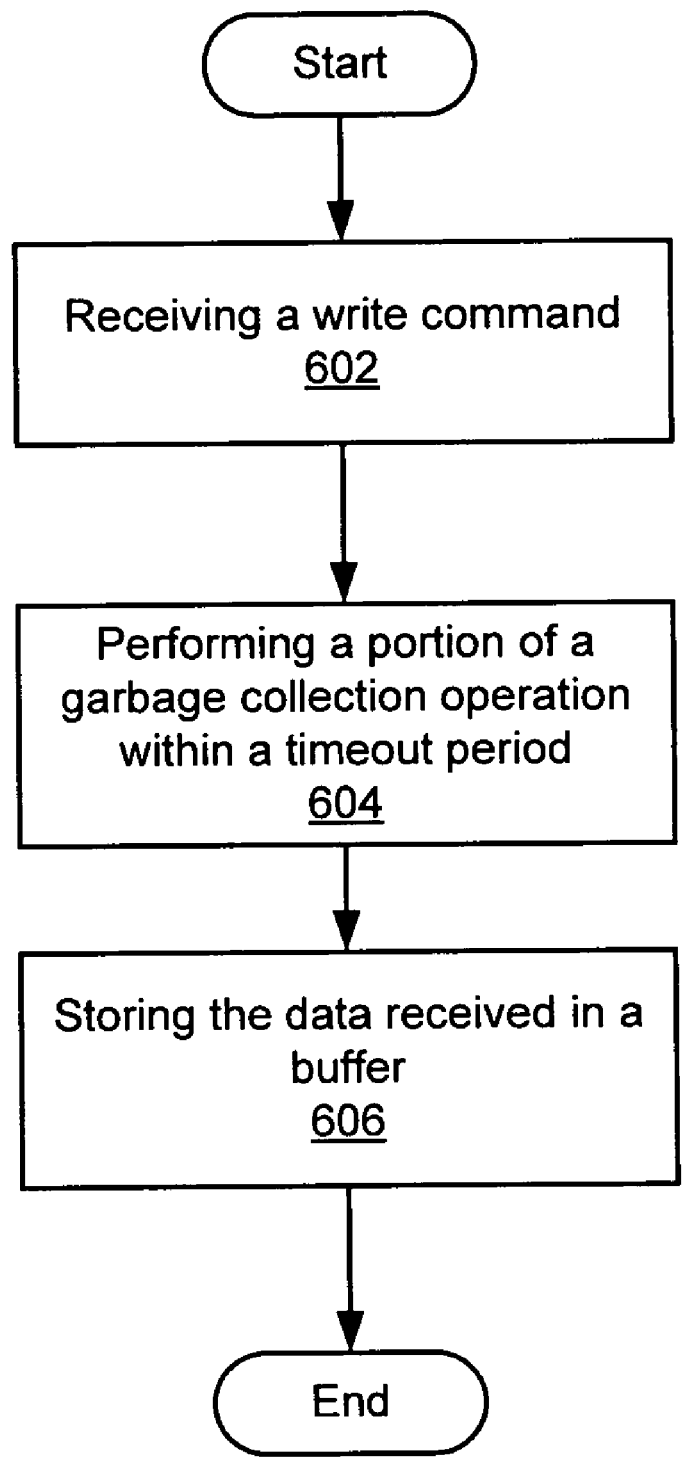
FIG. 6 is a flowchart diagram of a general overview of operations for phased garbage collection, in accordance with an embodiment of the present invention.

FIG. 6 is a flowchart diagram of a general overview of operations for phased garbage collection, in accordance with an embodiment of the present invention. It should be appreciated that data stored at specific host logical addresses can be overwritten by new data as the original stored data become obsolete. The non-volatile memory storage system, in response, writes the new data in an update block and then changes the logical-to-physical address table for those logical addresses to identify the new physical block to which the new data are stored. The blocks containing the original data at those logical addresses are then erased and made available for the storage of additional data. Such erasure can take place before a write operation. As a result, the memory controller learns that data at a given logical address have been rendered obsolete or invalid by the host after the new data are written to the same logical address. Many blocks of memory can therefore be storing invalid data for a period of time.

The sizes of blocks and metablocks are increasing and such increases result in a large proportion of individual data writes storing an amount of data that is less than the storage capacity of a metablock, and in many instances, even less than that of a block. Since the non-volatile memory storage system can direct new data to an erased pool metablock, such direction can result in portions of blocks or metablocks being unfilled. If the new data are updates of some data stored in another metablock, remaining valid metapages of data from that other metablock having logical addresses contiguous with those of the new data metapages are also copied in logical address order into the new metablock. The old metablock may retain other valid data metapages. Accordingly, data of certain metapages of an individual metablock can be rendered obsolete or invalid, and replaced by new data with the same logical address being written to a different metablock.

In order to maintain enough physical memory space to store data over a logical address space, such data can be periodically garbage collected (i.e., compacted or consolidated). In general, a garbage collection operation involves reading the valid data from a block and writing the valid data to a new block, ignoring invalid data in the process. For example, in the block diagram of FIG. 5, the creation of new data file 3 makes old data file 3 obsolete. Old data file 3 can be erased to reclaim the physical capacity used by old data file 3. However, such erase operation would trigger a garbage collection operation if file 2 and old file 3 are stored in the same physical block.

Returning to FIG. 6, the non-volatile memory storage system may perform the garbage collection operation within a timeout period allocated to a write command. If the garbage collection operation cannot be completed within one timeout period, then the one garbage collection operation may be split into several different phases (or portions), in accordance with an embodiment of the present invention. Here, the non-volatile memory storage system performs portions of the garbage collection operation using the timeout periods allocated to multiple write commands. In other words, the non-volatile memory storage system utilizes the timeout periods allocated to multiple write commands to perform portions of one garbage collection operation.

As shown in FIG. 6, a write command to write new data is received in operation 602. As used herein, the term "new data" is defined as the data received by the non-volatile memory storage system from a write command to be written to the memory. The write command is allocated a timeout period to complete the execution of the write command. In other words, the timeout period is a period of time allocated for an execution of the write command. An example of a timeout period allocated is 250 milliseconds. The write command can be a single sector write command or a multiple sectors write command. As will be explained in more detail below, in a single sector write command, new data can be written as single sectors to random addresses across a memory. In a multiple sectors write command, multiple sectors of new data having contiguous, logical addresses are written to the memory.

Figure 7:
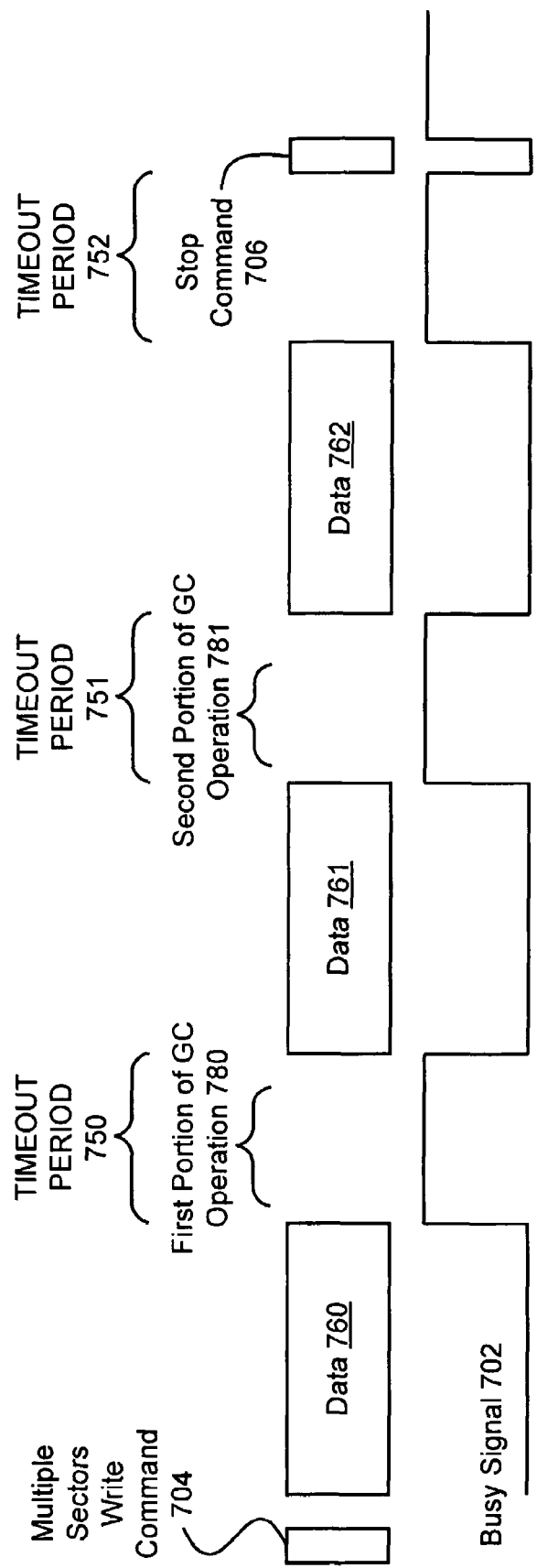
FIG. 7 shows a simplified block diagram of an example of one garbage collection operation split into multiple portions, in accordance with an embodiment of the present invention.

If one garbage collection operation cannot be completed within the timeout period, as shown in operation 604, a portion of the garbage collection operation is performed within the timeout period allocated to the write command. The remaining portions of the garbage collection can be completed at later timeout periods. For example, FIG. 7 shows a simplified block diagram of an example of one garbage collection operation split into multiple portions 780 and 781, in accordance with an embodiment of the invention. As shown in FIG. 7, a non-volatile memory storage system receives multiple sectors write command 704 and subsequently, multiple sectors of new data 760-762 are received for storage into memory. Busy signal 702 is asserted after each sector of data 760, 761, or 762 is received. The non-volatile memory storage system asserts busy signal 702 to allow the execution of the write command, which may include garbage collection operation (if needed), and other operations. A host does not send another command or additional data to the non-volatile memory storage system when busy signal 702 is asserted. The non-volatile memory storage system can assert busy signal 702 for a limited amount of time after each sector of data 760, 761, or 762 is received because the host allows a limited fixed amount of time (i.e., timeout periods 750-752) for the execution of the write command. If the busy signal remains active for longer than timeout period 750, 751, or 752, the host may repeat the write command or abort the process. Accordingly, the non-volatile memory storage system cannot assert busy signal 702 for more than timeout period 750, 751, or 752. Releasing busy signal 702 after the completion of writing multiple sectors of data 760-762 allows the host to communicate further with the non-volatile memory storage system.

Still referring to FIG. 7, portions 780 and 781 of the garbage collection can be allocated between multiple timeout periods 750-752. In other words, the non-volatile memory storage system can utilize each timeout period 750, 751, or 752 to perform each portion 780 or 781 of one garbage collection operation. For example, first portion 780 of one garbage collection is performed during first timeout period 750. Here, a portion of valid data can be copied from one block to another block during first timeout period 750. At second timeout period 751, the previous garbage collection operation started at first timeout period is continued. The non-volatile memory storage system performs second portion 781 of the previous garbage collection operation during timeout period 751 until the previous garbage collection is completed. The previous garbage collection can be completed by copying the remaining or last portion of the valid data from the one block to the other block. If the previous garbage collection operation cannot be completed within second timeout period 751, then the non-volatile memory storage system can use subsequent timeout periods, such as third timeout period 752, to complete the garbage collection operation. At the end of multiple sectors write command 704, the non-volatile memory storage system can assert busy signal 702 after stop command 706 is received until all sectors of data 760-762 are written to the memory cell array. It should be noted that FIG. 7 illustrates the operations associated with a multiple sectors write command. As will be explained in more detail below, the garbage collection operations performed may be different for single sector write commands and multiple sectors write commands. For example, as will be explained in more detail below, the type of buffer used to store the new data may depend on whether the write command received is a single sector write command or a multiple sectors write command.

Returning to FIG. 6, after a portion of the garbage collection operation is performed within a timeout period, the new data received from the write operation can be stored in a buffer associated with the non-volatile memory storage system in operation 606. In an embodiment, the buffer may be a data structure associated with the non-volatile memory cell array (e.g., non-volatile memory array 122 shown in FIG. 1). An example of a data structure includes a block of the non-volatile memory cell array, such as a phased garbage collection block or a scratch pad block, which will be described in more detail below. In another embodiment, the buffer may be a block of a volatile memory cell array. For example, the new data may be stored in a block located in the RAM associated with the non-volatile memory storage system (e.g., RAM 112 shown in FIG. 1). In still another embodiment, as discussed above, the new data may be stored in a block located in a separate memory cell array (e.g., memory cell array 123 shown in FIG. 1).

Use of a Phased Garbage Collection Block as a Buffer

Figure 8:
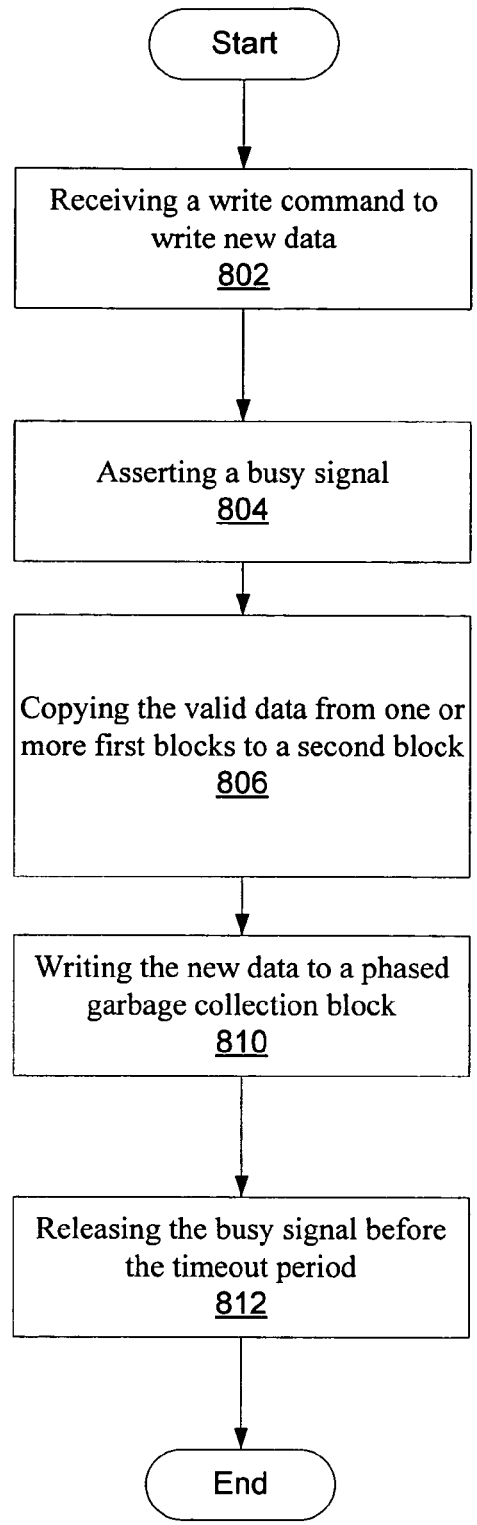
FIG. 8 is a flowchart diagram of detailed operations for performing a phased garbage collection with the use of a phased garbage collection block as a buffer, in accordance with an embodiment of the present invention.

FIG. 8 is a flowchart diagram of detailed operations for performing a phased garbage collection with the use of a phased garbage collection block as a buffer, in accordance with an embodiment of the present invention. As shown in FIG. 8, a write command is received in operation 802 to write new data to a memory. As will be explained in more detail below, the write command may be a single sector write command to write a single sector of data to the memory. After the write command is received, the non-volatile memory storage system asserts a busy signal in operation 804.

Before the write command is executed, a portion of the garbage collection operation is performed for a garbage collection time period. For example, in an embodiment, one or more first blocks are selected for a garbage collection operation. The one or more first blocks can include invalid data and/or valid data. As shown in operation 806, the valid data are copied from the one or more first blocks to a second block for a garbage collection time period in the garbage collection operation. Depending on the garbage collection time period allocated to the garbage collection operation and on the amount of valid data that are to be copied, all the valid data or a portion of the valid data are copied to the second block. In an example, the garbage collection time period allocated for the garbage collection operation can be expressed as $$\text{Garbage collection time period} = \text{Timeout Period} - 2*\text{Tprog} \quad (1.0)$$

where timeout period, as discussed above, is a fixed, limited period of time. Tprog is the maximum programming time associated with writing the new data to memory or is the maximum time the non-volatile memory storage system takes to write the new data to the memory. In Equation 1.0, there are two maximum programming times (i.e., $2*\text{Tprog}$). As will be explained in more detail below, the first maximum programming time is attributed to writing the new data to a third block and the second maximum programming time is attributed to writing the new data to a scratch pad block. As a result, in an embodiment, the non-volatile memory storage system tracks the amount of time for copying the valid data from the one or more first blocks to the second block. The non-volatile memory storage system stops the copy before the time exceeds the garbage collection time period.

If the garbage collection operation cannot be completed by the garbage collection time period, then the new data associated with the write command can be written to a phased garbage collection block in operation 810. The non-volatile memory storage system can write the new data to the phased garbage collection block before, during, or after the garbage collection operation. The phased garbage collection block has the characteristics of an update block. In general, data received from a write command may be written to an update block. A dedicated metablock can be assigned as an update block for each logical group within which data are being updated. A logical group is a group of logical addresses with a size that may equal to the size of a metablock. It should be noted that logical sectors of data are stored in logical groups comprising a set of logically contiguous sectors. As will be explained in more detail below, an update block can be managed to receive data in either sequential order or chaotic order (i.e., non-sequential order). The phased garbage collection block may or may not be associated with the one or more first blocks and the second block. For example, in an embodiment, the one or more first blocks, the second block, and the phased garbage collection block are configured to span a single logical group or a single group of logical addresses. As a result, data from a single logical group can be stored in the phased garbage collection block, but data from a different logical group cannot be stored in the phased garbage collection block.

After the new data are written to the phased garbage collection block and the garbage collection operation is performed for the garbage collection time period, the non-volatile memory storage system releases the busy signal before the timeout period in operation 812. Thus, the total time for executing the write command that includes one garbage collection operation or a portion of one garbage collection operation does not exceed the timeout period. If a portion of the garbage collection operation is performed within the timeout period, then the remaining portions are completed at subsequent timeout periods. When the garbage collection operation is complete, the one or more first blocks being garbage collected are erased (or marked as obsolete) and made available for the storage of additional data. Additionally, as will be explained in more detail below, the phased garbage collection block can be converted into an update block. Thereafter, another, new phased garbage collection block that replaces the phased garbage collection block, which was converted into an update block, may be allocated to store new data from subsequent write commands in phased garbage collection operations.

Figure 9A:
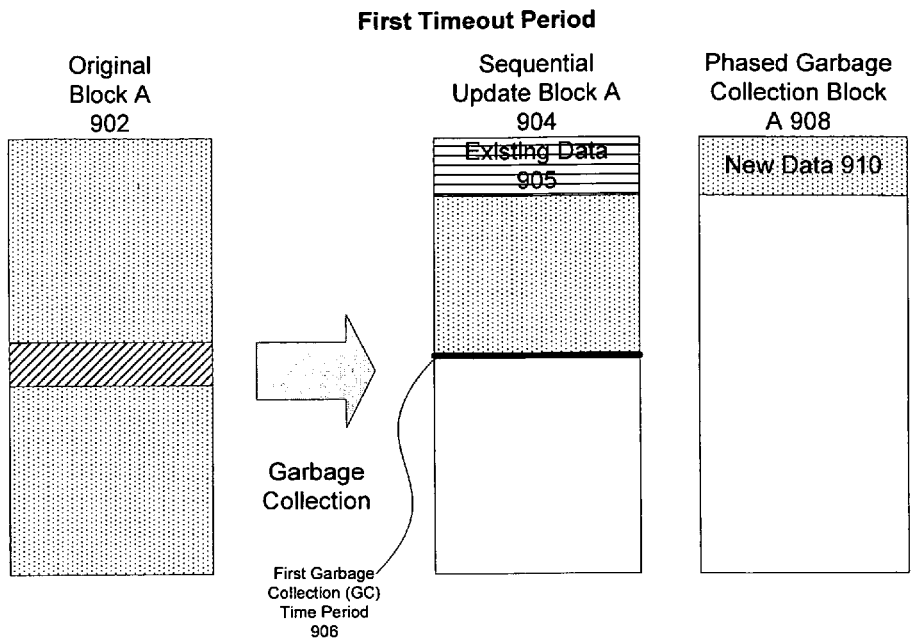
FIGS. 9A and 9B are simplified block diagrams of memory blocks with sequential update blocks being garbage collected in phases, in accordance with embodiments of the present invention.
Figure 9B:
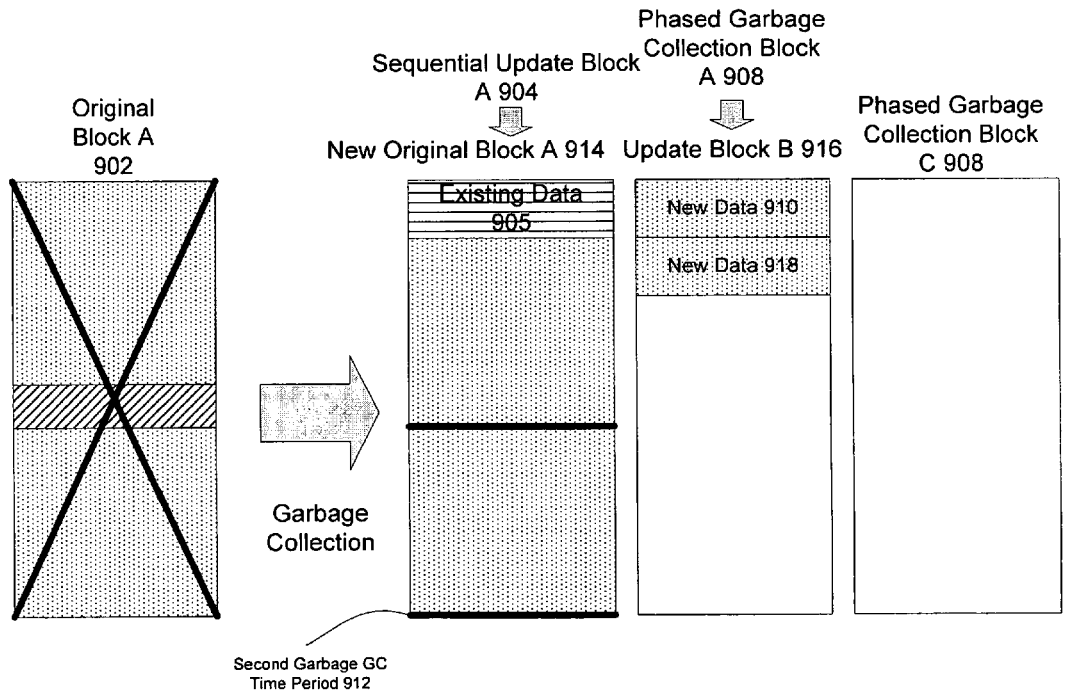

FIGS. 9A and 9B are simplified block diagrams of memory blocks with sequential update blocks being garbage collected in phases, in accordance with embodiments of the present invention. As shown in FIG. 9A, original block A 902 and associated sequential update block A 904 are selected for garbage collection. An update block can be managed to receive data in either sequential order or chaotic order (i.e., non-sequential order). It should be appreciated that a sequential update block, such as sequential update block A 904, is a metablock allocated when a write command is received from the host to write data that fills one or more physical page in a logical group for which all valid sectors are currently located in the same metablock. Sectors of data written to the sequential update block are written sequentially in logical addressing such that the sectors supersede the corresponding logical sectors written in the original block. A sector updated in this logical group can be written to this sequential update block, until the sequential update block is either closed or converted to a chaotic update block. It should be noted that the sequential update block is considered closed when the last physical sector location of the sequential update block is written. In other words, closure of the sequential update block may result from the sequential update block being completely filled by updated sector data written by the host or copied from the original block. As will be explained in more detail below, the chaotic update block can be created by conversion from a sequential update block when a sector of data written by a host is logically non-sequential to the previously written sector of data within the logical group being updated.

Original block A 902 can include invalid and valid data, which is represented in FIG. 9A by hatched pattern and dotted pattern, respectively. It should be noted that in addition to valid data from original block A 902, sequential update block A 904 additionally includes existing data 905 that were written to the sequential block A before the garbage collection operation. When a write command to write new data 910 is received, the write command may trigger the closure of sequential update block A 904, which is a type of garbage collection operation, because the new data are associated with a logical group that is different from the sequential update block A. The non-volatile memory storage system asserts a busy signal and then copies the valid data from original block A 902 to sequential update block A 904 until first garbage collection time period 906 is reached. During copying, the non-volatile memory storage system tracks the time, and the non-volatile memory storage system stops the copy operation before first garbage collection time period 906 is exceeded. As shown in FIG. 9A, the garbage collection operation cannot be completed within first garbage collection time period 906 as there are still valid data remaining in original block A 902. As a result, after the portion of valid data are copied to sequential update block A 904, new data 910 are written to phased garbage collection block A 908 within the remaining time allowed before first timeout period is reached.

FIG. 9B shows that the remaining portion of the garbage collection operation can be completed within a second timeout period. Here, a second write command to write new data 918 is received after the first write command. As a result, a second timeout period is allocated to the second write command. During the second timeout period, the remaining valid data are copied from original block A 902 to sequential update block A 904. In this example, all the remaining valid data (or last portion of the valid data) can be copied to sequential update block A 904 within second garbage collection time period 912. Accordingly, the garbage collection operation can be completed within the second timeout period. Original block A 902 is erased and can be made available for the storage of additional data because the garbage collection operation is completed in this second timeout period. Since sequential update block A 904 is filled, the sequential update block A is converted to new original block A 914 or a non-update block. Further, phased garbage collection block A 908 is converted to an update block, such as update block B 916, that may or may not be associated with new original block A 914. A new phased garbage collection block, such as phased garbage collection block C 908, is also allocated to store new data. If new data 918 from the second write command are from the same logical group as new data 910, then the new data 918 from the second write command may be written to update block B 916. On the other hand, as will be explained in more detail below, if new data 918 from the second write command are from a different logical group from new data 910, then the new data 918 from the second write command are written to phased garbage collection block C 908.

Figure 10A:
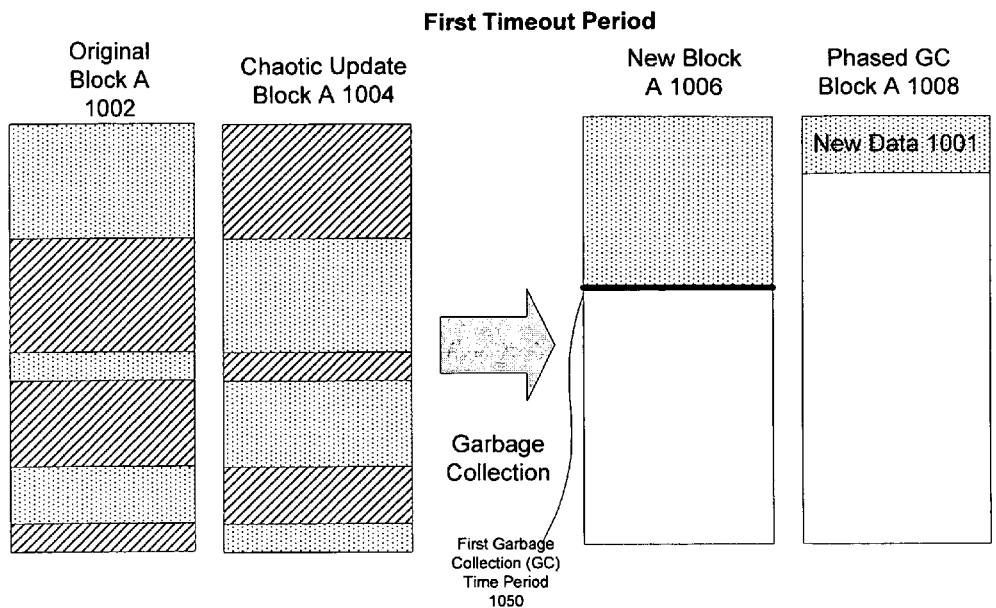
FIGS. 10A and 10B are simplified block diagrams of memory blocks with chaotic update blocks being garbage collected in phases, in accordance with an embodiment of the present invention.
Figure 10B:
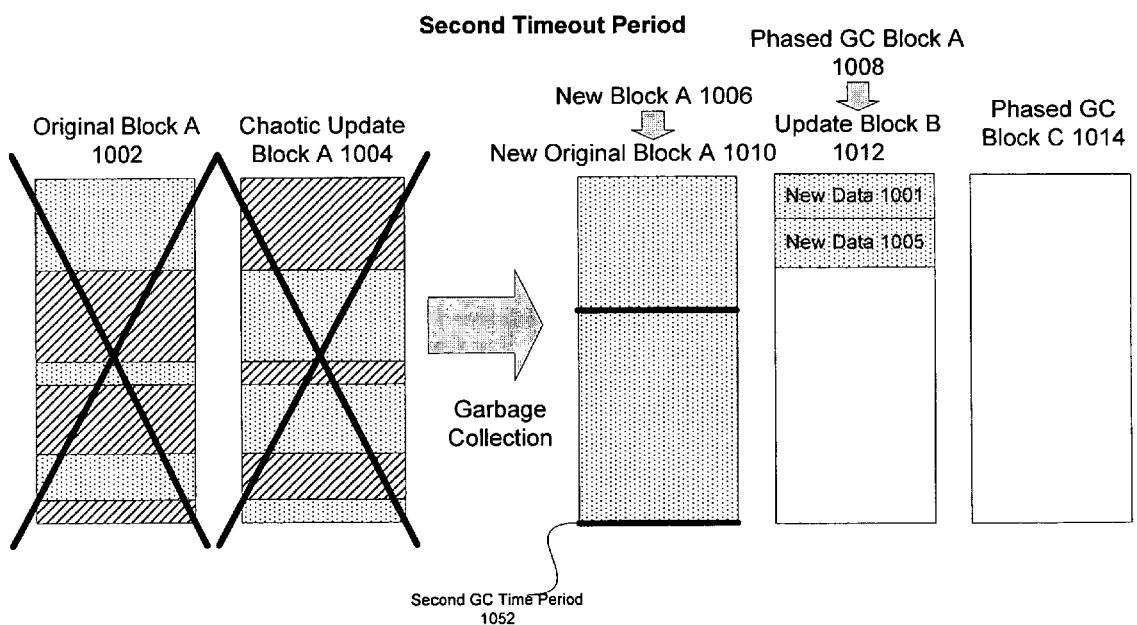

FIGS. 10A and 10B are simplified block diagrams of memory blocks with chaotic update blocks being garbage collected in phases, in accordance with an embodiment of the present invention. As shown in FIG. 10A, original block A 1002 and chaotic update block A 1004 are selected for garbage collection. In general, a chaotic update block, such as chaotic update block A 1004, allows sectors of data to be updated in a random order within a logical group, and with any repetition of individual sectors. The chaotic update block can be created by conversion from a sequential update block when a sector of data written by a host is logically non-sequential to the previously written sector of data within the logical group being updated. All sectors of data subsequently updated in this logical group are written in the next available sector location in the chaotic update block, whatever their logical sector address within the group.

Here, original block A 1002 and chaotic update block A 1004 include invalid and valid data, which is represented in FIG. 10A by a hatched pattern and a dotted pattern, respectively. When a write command to write new data 1001 is received, the non-volatile memory storage system asserts a busy signal and then copies the valid data from original block A 1002 and chaotic update block A 1004 to new block A 1006 until first garbage collection time period 1050 is reached. During copying, the non-volatile memory storage system tracks the time, and the non-volatile memory storage system stops the copy operation before first garbage collection time period 1050 is exceeded. As shown in FIG. 10A, the garbage collection operation cannot be completed within first garbage collection time period 1050 as there are still valid data remaining in original block A 1002 and chaotic update block A 1004. As a result, after the portion of the valid data are copied to new block A 1006, new data 1001 received before the garbage collection operation started are written to phased garbage collection block A 1008 before first timeout period is reached.

FIG. 10B shows that the remaining portion of the garbage collection operation can be completed in a second timeout period. A second write command is received after the first write command. As a result, a second timeout period is allocated to the second write command. During the second timeout period, the remaining valid data are copied from original block A 1002 and chaotic update block A 1004 to new block A 1006. Here, all the remaining valid data (or last portion of the valid data) can be copied to new block A 1006 within second garbage collection time period 1052. Accordingly, the garbage collection operation can be completed within the second timeout period. Since the garbage collection operation is completed in this second timeout period, original block A 1002 and chaotic update block A 1004 may be erased and made available for the storage of additional data. After original block A 1002 and chaotic update block A 1004 are erased, new block A 1006 is converted into new original block A 1010 and phased garbage collection block A 1008 is converted into update block B 1012, which may or may not be associated with the new original block A. Since garbage collection operation is completed, another phased garbage collection block C 1014 is allocated to store new data. As shown in FIG. 10B, if new data 1005 received from the second write command are in the same logical group as new data 1001, then the new data 1005 may be written to update block B 1012. However, as will be explained in more detail below, if new data 1005 are from a different logical group from new data 1001, then the new data 1005 are written to phased garbage collection block C 1014.

Figure 11A:
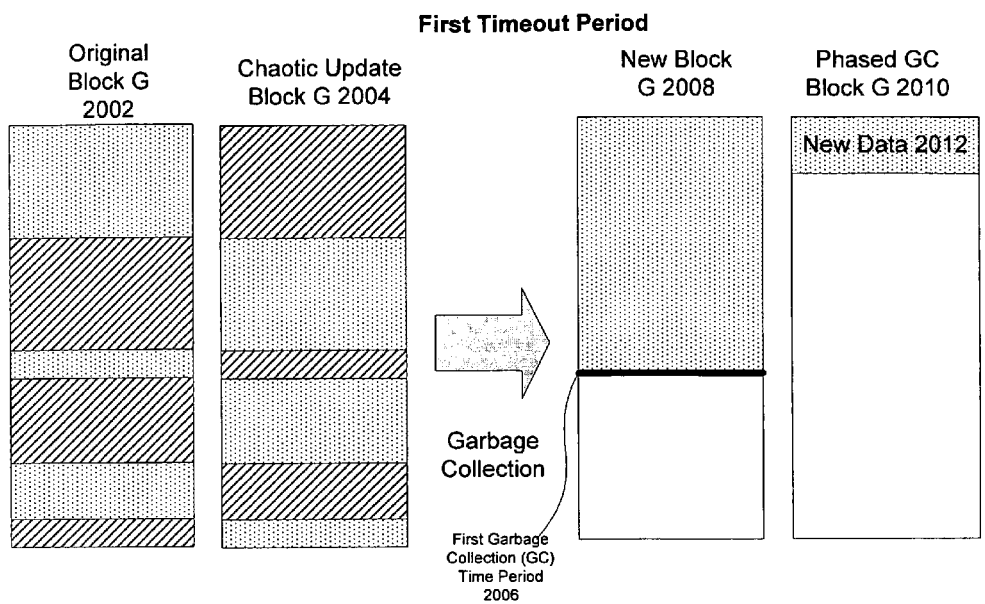
FIGS. 11A, 11B, 11C, 11D, and 11E are simplified block diagrams of memory blocks with chaotic update blocks being garbage collected in phases, in accordance with another embodiment of the present invention.

FIGS. 11A-11E are simplified block diagrams of memory blocks with chaotic update blocks being garbage collected in phases, in accordance with another embodiment of the present invention. As shown in FIG. 11A, original block G 2002 and chaotic update block G 2004 are selected for garbage collection when a write command to write new data 2012 is received. Here, original block G 2002 and chaotic update block G 2004 include invalid and valid data, which is represented in FIG. 11A by a hatched pattern and a dotted pattern, respectively. After the write command is received, the non-volatile memory storage system asserts a busy signal and then copies the valid data from original block G 2002 and from chaotic update block G 2004 to new block G 2008 until first garbage collection time period 2006 is reached. During copying, the non-volatile memory storage system tracks the time, and the non-volatile memory storage system stops the copy operation before first garbage collection time period 2006 is exceeded. As shown in FIG. 11A, the garbage collection operation cannot be completed within first garbage collection time period 2006 as there are still valid data remaining in original block G 2002 and chaotic update block G 2004. As a result, after the portion of the valid data are copied to new block G 2008, new data 2012 received before the garbage collection operation started are written to phased garbage collection block G 2010 before first timeout period is reached.

Figure 11B:
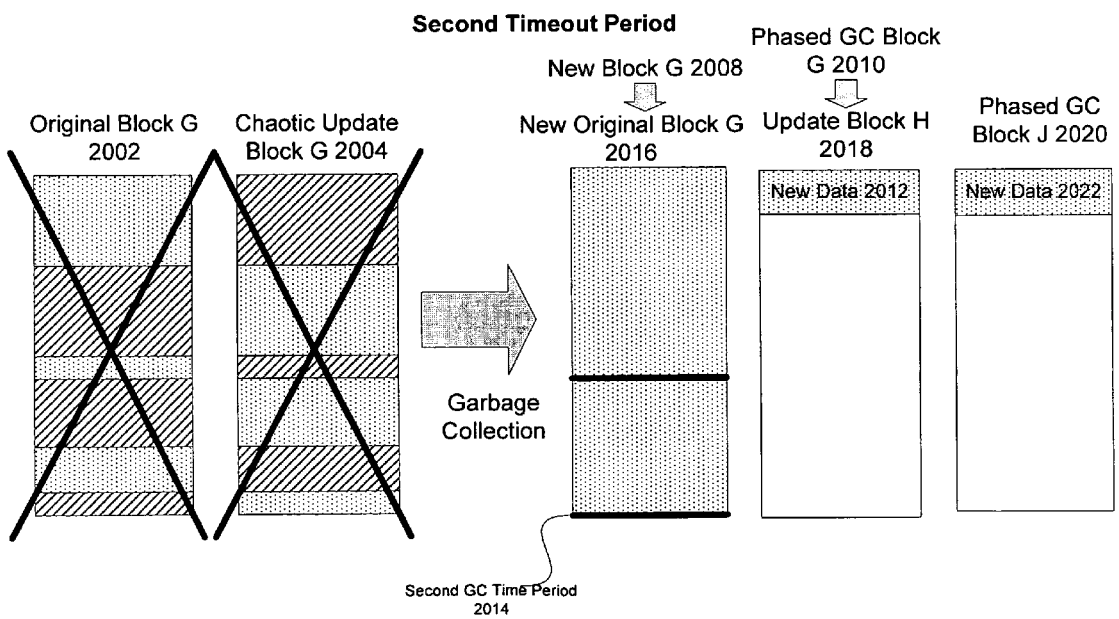

FIG. 11B shows that the remaining portion of the garbage collection operation can be completed in a second timeout period. A second write command is received after the first write command. As a result, a second timeout period is allocated to the second write command. During the second timeout period, the remaining valid data are copied from original block G 2002 and chaotic update block G 2004 to new block G 2006. Here, all the remaining valid data (or last portion of the valid data) can be copied to new block G 2008 within second garbage collection time period 2014. Accordingly, the garbage collection operation can be completed within the second timeout period. Since the garbage collection operation is completed in this second timeout period, original block G 2002 and chaotic update block G 2004 may be erased and made available for the storage of additional data. Furthermore, new block G 2008 is converted into new original block G 2016 and phased garbage collection block G 2010 is converted into update block H 2018. Since garbage collection operation is completed, another phased garbage collection block J 2020 is allocated to store new data. If new data 2022 received from the second write command are in the same logical group as new data 2012, then the new data 2022 may be written to update block H 2018. However, in the example shown in FIG. 11B, new data 2022 and new data 2012 are from different logical groups. As a result, new data 2022 are written to phased garbage collection block J 2020 instead of update block H 2018.

Figure 11C:
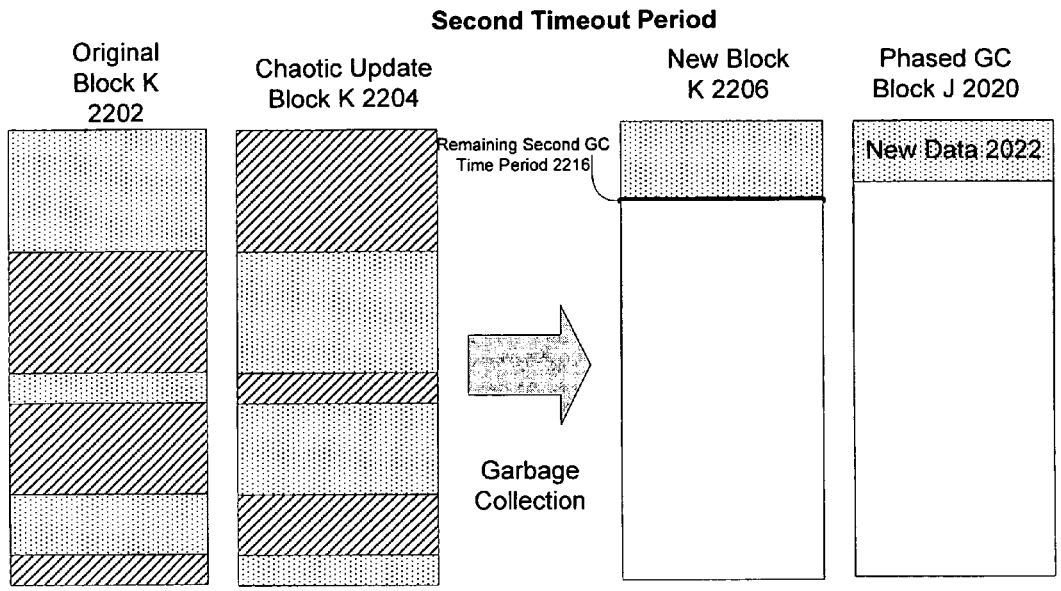

Since phased garbage collection block J 2020 can store data from a single logical group, the phased garbage collection block J may not be able to store new data that may be received in subsequent write operations. Therefore, a new garbage collection operation is performed during second garbage collection time period 2014. As shown in FIG. 11C, another garbage collection operation is performed during the remaining time left over in the second garbage collection time period. Here, original block K 2202 and chaotic update block K 2204 are selected for garbage collection. Original block K 2202 and chaotic update block K 2204 include invalid and valid data, which is represented in FIG. 11C by a hatched pattern and a dotted pattern, respectively. After the completion of the garbage collection operation shown in FIG. 11B, the non-volatile memory storage system uses the remaining time (i.e., remaining second garbage collection time period 2216) within the second timeout period to copy the valid data from original block K 2202 and chaotic update block K 2204 to new block K 2206. As shown in FIG. 11C, the garbage collection operation cannot be completed within remaining second garbage collection time period 2216 as there are still valid data remaining in original block K 2202 and chaotic update block K 2204.

Figure 11D:
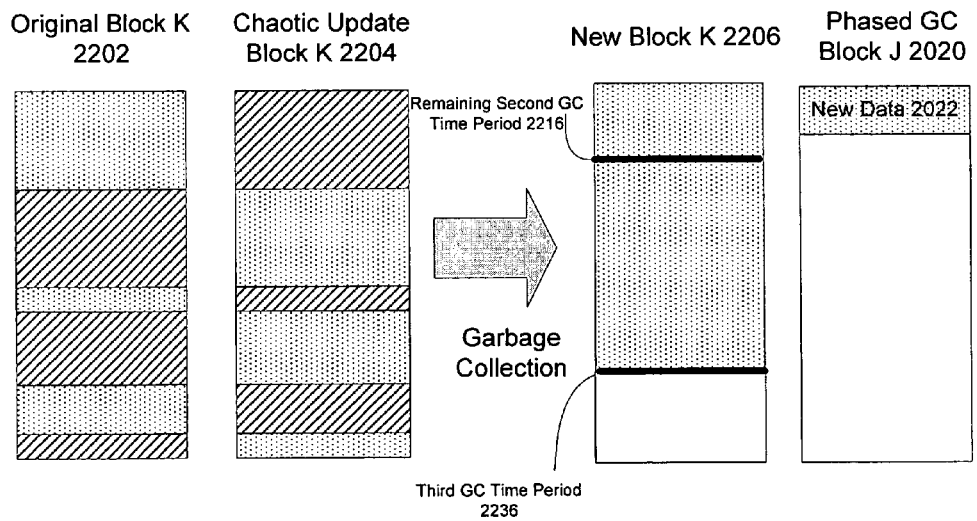

In FIG. 11D, a third write command is received after the second write command and a third timeout period is allocated to the third write command. Within third garbage collection time period 2236, a garbage collection operation cannot be completed. New block K 2206 cannot therefore be converted into an update block. In this example, the new data received from the third write command belong to a different logical group from new data 2022, and do not have an open update block. Data from a single logical group can be stored in phased garbage collection block J 2020 but data from different logical groups cannot be stored in the phased garbage collection block J. As a result, no blocks are available to store the new data received from the third write command.

In the example of FIG. 11D, when new data are received and there already are data, such as new data 2022, stored in phased garbage collection block J 2020, then data in the phased garbage collection block J are to be garbage collected before the new data from the third write command can be written or programmed. The third timeout period allocated to the completion of the third write command can be used for the garbage collection operation. However, if third garbage collection time period 2236 does not provide enough time to complete the garbage collection operation, then phased garbage collection block J 2020 is not empty and therefore is not ready to receive or store new data from the third write command. Accordingly, the new data cannot be written within the third timeout period and a timeout error will occur.

Figure 11E:
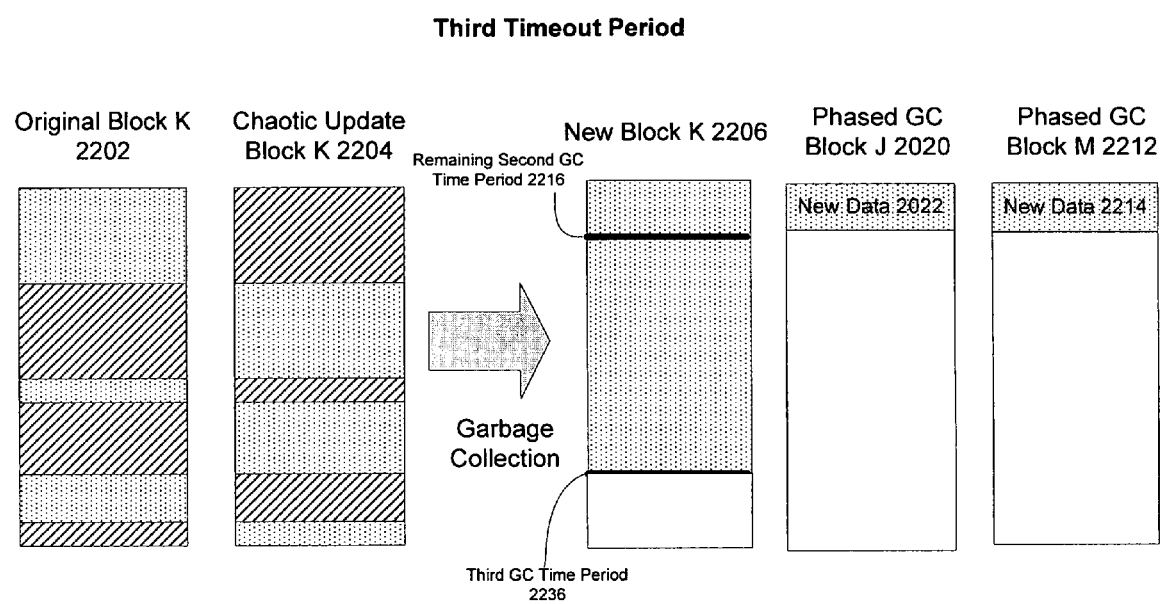

To accommodate the new data received from the third write command, FIG. 11E shows the allocation of another phased garbage collection block, namely phased garbage collection block M 2212, for use in a garbage collection operation in the third timeout period. If the remaining second garbage collection time period 2216 does not provide enough time to complete the second garbage collection operation shown in FIG. 11C, then the non-volatile memory storage system may initially allocate two or more phased garbage collection blocks. As shown in FIG. 11E, two phased garbage collection blocks, phased garbage collection block J 2020 and phased garbage collection block M 2212, are initially allocated. With the additional allocated phased garbage collection block M 2212, if the garbage collection operation cannot be completed within third timeout period, then new data 2214 received from the third write command that belong to a different logical group from new data 2022 may be stored in the phased garbage collection block M. As a result, new data 2214 can be written within the third timeout period and a timeout error will not occur.

Use of a Scratch Pad Block as a Buffer

Figure 12:
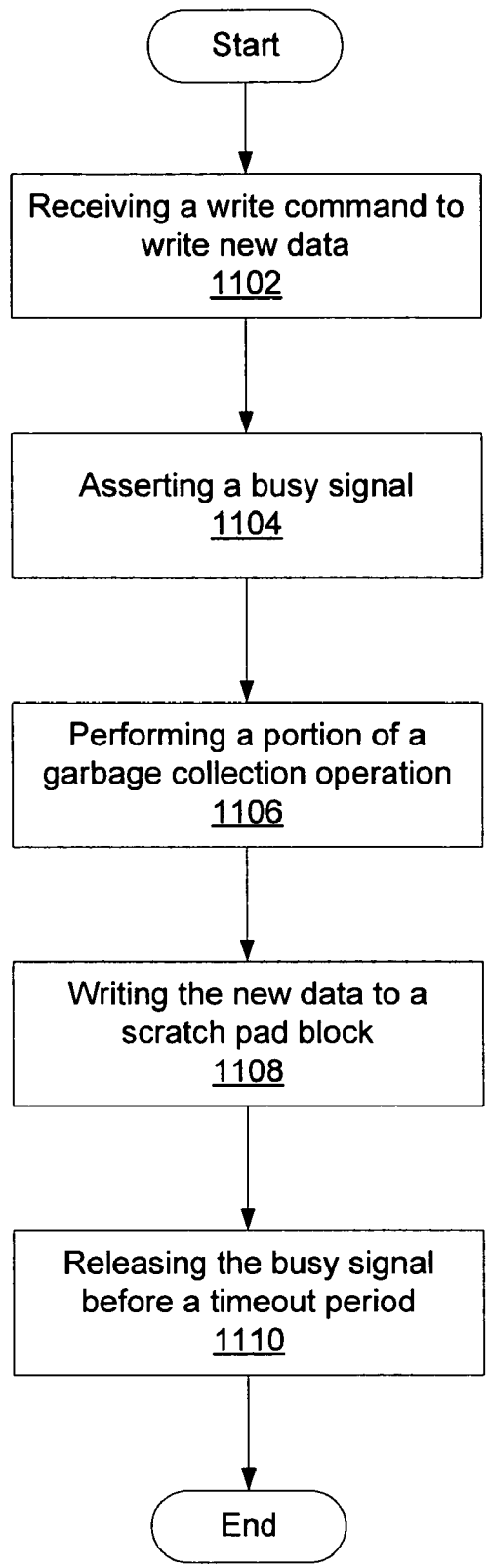
FIG. 12 is a flowchart diagram of detailed operations for performing a phased garbage collection with the use of a scratch pad block as a buffer, in accordance with an embodiment of the present invention.

FIG. 12 is a flowchart diagram of detailed operations for performing a phased garbage collection with the use of a scratch pad block as a buffer, in accordance with an embodiment of the present invention. As shown in FIG. 12, a write command is received in operation 1102 to write new data to a memory. In an embodiment, the write command is a single sector write command. In some circumstances, as will be explained in more detail below, the write command can also be a multiple sectors write command, in accordance with another embodiment. After the write command is received, the non-volatile memory storage system asserts a busy signal in operation 1104.

Before the write command is executed, a portion of the garbage collection operation is performed for a garbage collection time period in operation 1106. For example, in an embodiment, one or more first blocks are selected for garbage collection operation. The one or more first blocks can include invalid data and/or valid data. The valid data are copied to a second block for a garbage collection time period. Depending on the garbage collection time period allocated to the garbage collection operation and on the amount of valid data that are to be copied, all the valid data or a portion of the valid data are copied to the second block. In an example, the garbage collection time period allocated for the garbage collection operation can be expressed as $$\text{Garbage collection time period} = \text{Timeout Period} - T_{prog} \quad (2.0)$$

where timeout period, as discussed above, is a fixed, limited period of time. Tprog is the maximum programming time associated with writing the new data to memory or is the maximum time the non-volatile memory storage system takes to write the new data to the memory. As a result, in an embodiment, the non-volatile memory storage system tracks the amount of time for copying the valid data from the one or more first blocks to the second block. The non-volatile memory storage system stops the copy before the time exceeds the garbage collection time period.

If the garbage collection operation cannot be completed by the garbage collection time period, then the new data associated with the write command can be written to the scratch pad block in operation 1108. It should be appreciated that a scratch pad block is a form of data update block in which logical sectors within an associated logical group may be updated in a random order and with any amount of repetition. The scratch pad block is created by a write command where the intended logical sectors do not end or cross a physical page boundary. Since the non-volatile memory storage system may not be able to program partial pages, sectors of a page can be temporarily stored in the scratch pad block. The non-volatile memory storage system accumulates sectors of the page in the scratch pad block until all the sectors of the page are filled with new data from various write commands. The non-volatile memory storage system then copies the full page (e.g., eight sectors of new data) from the scratch pad block to another block, such as an update block, in one program operation. Scratch pad block can therefore contain partial physical page worth of data. The scratch pad block can hold a valid page of new data for each update block in the non-volatile memory storage system. Additionally, in an embodiment, the scratch pad block can hold one or more valid pages of new data that do not have update blocks. The non-volatile memory storage system can have, for example, eight update blocks allocated and therefore, the scratch pad block can store nine or more valid pages of new data. The non-volatile memory storage system can write the new data to the scratch pad block before, during, or after the garbage collection operation. As will be explained in more detail below, the new data may be copied from the scratch pad block to an update block upon completion of the garbage collection operation, once additional sectors of new data are received such that the physical page boundary is reached or crossed.

After the new data are written to the scratch pad block and the garbage collection operation is performed for the garbage collection time period, the non-volatile memory storage system releases the busy signal before the timeout period in operation 1110. Thus, the total time for executing the write command that includes one garbage collection operation or a portion of one garbage collection operation does not exceed the timeout period. If a portion of the garbage collection operation is performed within the timeout period, then the remaining portions are completed at subsequent timeout periods. When the garbage collection operation is complete, the one or more first blocks being garbage collected are erased and made available for the storage of additional data.

Figure 13A:
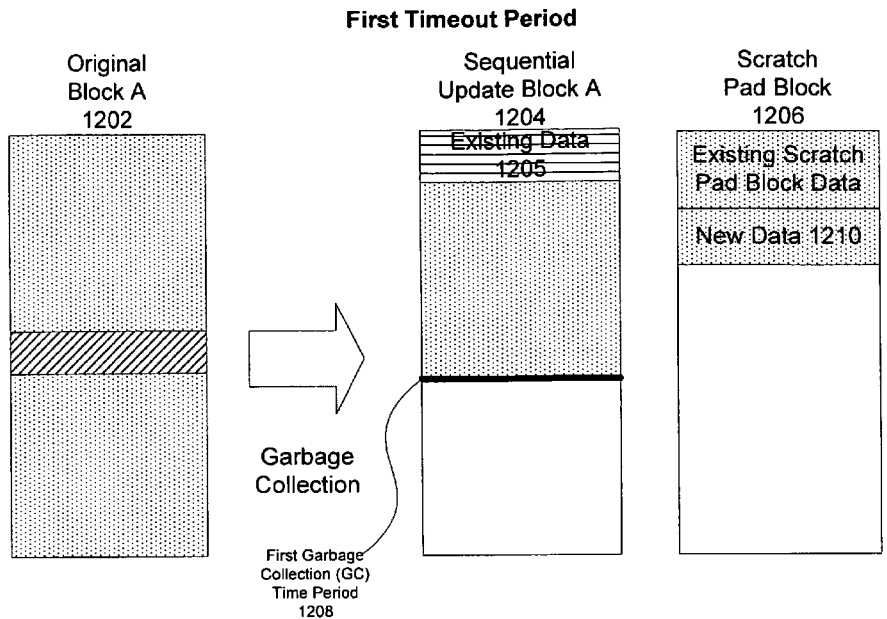
FIGS. 13A and 13B are simplified block diagrams of memory blocks with sequential update blocks being garbage collected in phases, in accordance with embodiments of the present invention.
Figure 13B:
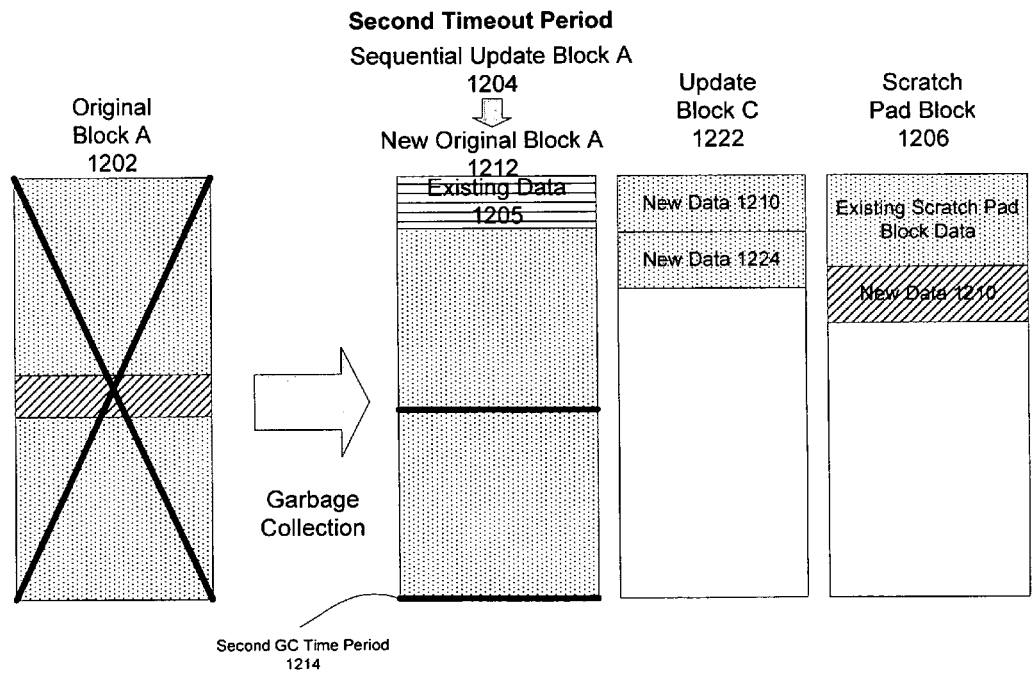

FIGS. 13A and 13B are simplified block diagrams of memory blocks with sequential update blocks being garbage collected in phases, in accordance with embodiments of the present invention. As shown in FIG. 13A, original block A 1202 and associated sequential update block A 1204 are selected for garbage collection. Original block A 1202 can include invalid and valid data, which is represented in FIG. 13A by hatched pattern and dotted pattern, respectively. When a write command to write new data 1210 is received, the write command may trigger the closure of sequential update block A 1204, which is a type of garbage collection operation, because the new data are associated with a logical group that does not have an open update block or because the new data result in the conversion of the sequential update block A to a chaotic update block. The non-volatile memory storage system asserts a busy signal and then copies the valid data from original block A 1202 to sequential update block A 1204 until first garbage collection time period 1208 is reached. It should be noted that in addition to valid data from original block A 1202, sequential update block A 1204 additionally includes existing data 1205 that were written to the sequential update block A before the garbage collection operation. During copying, the non-volatile memory storage system tracks the time, and the non-volatile memory storage system stops the copy operation before first garbage collection time period 1208 is exceeded. As shown in FIG. 13A, the garbage collection operation cannot be completed within first garbage collection time period 1208 as there are still valid data remaining in original block A 1202. As a result, after the portion of valid data is copied to sequential update block A 1204, new data 1210 are written to scratch pad block 1206.

FIG. 13B shows that the remaining portion of the garbage collection operation can be completed within a second timeout period. Here, a second write command to write new data 1224 is received after the first write command. As a result, a second timeout period is allocated to the second write command. During the second timeout period, the remaining valid data are copied from original block A 1202 to sequential update block A 1204. In this example, all the remaining valid data (or last portion of the valid data) can be copied to sequential update block A 1204 within second garbage collection time period 1214. Accordingly, the garbage collection operation can be completed within the second timeout period. Since sequential update block A 1204 is filled, the sequential update block A is converted to new original block A 1212 or a non-update block. Original block A 1202 is erased and can be made available for the storage of additional data because the garbage collection operation is completed in this second timeout period. After original block A 1202 is erased, update block C 1222 is allocated and new data 1222 received from the second write command may be written to the newly allocated update block C. It should be noted that update block C 1222 may or may not be associated with new original block A 1212.

After the garbage collection is completed within the second timeout period, the non-volatile memory storage system may copy new data 1210 stored in scratch pad block 1206 to update block C 1222 if there is time available within the second timeout period. Scratch pad block 1206 serves as a temporary buffer, as new data, such as new data 1210, written to the scratch pad block are later copied to another block (e.g., updated block C 1222). In the example of FIG. 13B, there is time for copying new data 1210 from scratch pad block 1206 to update block C 1222 within the second timeout period. New data 1210, which are stored in scratch pad block 1206, are in the same logical group as new data 1224. Therefore, new data 1210 are copied to update block C 1222 after the completion of the garbage collection operation. New data 1210 stored in scratch pad block 1206 are marked as invalid and therefore, additional space in the scratch pad block could be made available for the storage of additional new data. It should be noted that new data 1210 and new data 1224 may belong to different logical groups. If new data 1210 and new data 1224 belong to different logical groups, then new data 1210 will remain in scratch pad block 1206. Once new data 1224 are written to update block C 1222, a new garbage collection operation may be initiated within the second timeout period. A new update block (not shown) may therefore be allocated with the completion of the new garbage collection operation and new data 1210 may be copied from scratch pad block 1206 to the new update block.

Figure 14A:
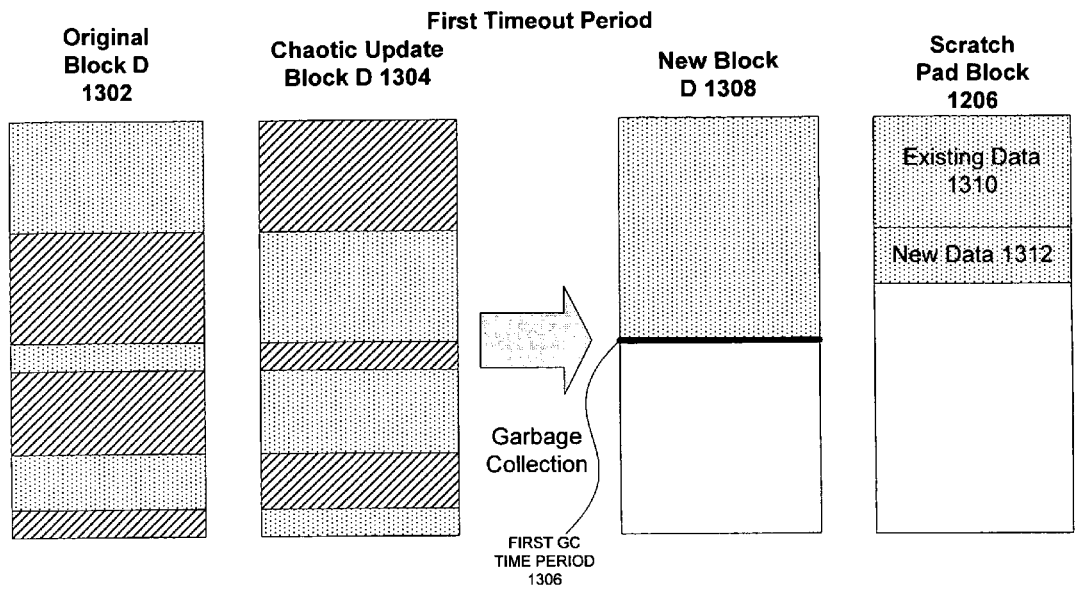
FIGS. 14A and 14B are simplified block diagrams of memory blocks with chaotic update blocks being garbage collected in phases, in accordance with embodiments of the present invention.
Figure 14B:
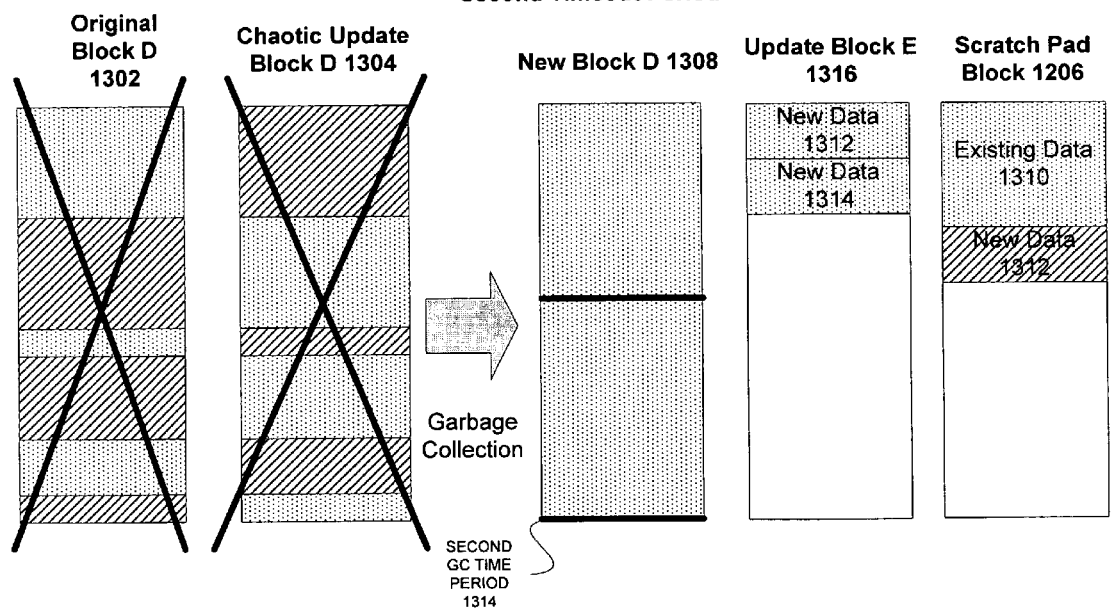

FIGS. 14A and 14B are simplified block diagrams of memory blocks with chaotic update blocks being garbage collected in phases, in accordance with embodiments of the present invention. As shown in FIG. 14A, original block D 1302 and chaotic update block D 1304 are selected for garbage collection. Here, original block D 1302 and chaotic update block D 1304 include invalid and valid data, which is represented in FIG. 14A by a hatched pattern and a dotted pattern, respectively. When a write command to write new data 1312 is received, the non-volatile memory storage system asserts a busy signal and then copies the valid data from original block D 1302 and chaotic update block D 1304 to new block D 1308 until first garbage collection time period 1306 is reached. During copying, the non-volatile memory storage system tracks the time, and the non-volatile memory storage system stops the copy operation before first garbage collection time period 1306 is exceeded. As shown in FIG. 14A, the garbage collection operation cannot be completed within first garbage collection time period 1306 as there are still valid data remaining in original block D 1302 and chaotic update block D 1304. As a result, after the portion of the valid data are copied to new block D 1308, new data 1312 received before the garbage collection operation started are written to scratch pad block 1206 before the first timeout period is reached.

FIG. 14B shows that the remaining portion of the garbage collection operation can be completed in a second timeout period. A second write command is received after the first write command. As a result, a second timeout period is allocated to the second write command. During the second timeout period, the remaining valid data are copied from original block D 1302 and chaotic update block D 1304 to new block D 1308. Here, all the remaining valid data (or the last portion of the valid data) can be copied to new block D 1308 within second garbage collection time period 1314. Accordingly, the garbage collection operation can be completed within the second timeout period. Since the garbage collection operation is completed in this second timeout period, original block D 1302 and chaotic update block D 1304 may be erased and made available for the storage of additional data. After original block D 1302 and chaotic update block A 1304 are erased, new update block E 1316 is allocated and new data 1314 received from the second write command are written to the newly allocated update block E. Again, new data 1314 are not written to scratch pad block 1206 because an update block is available after the completion of the garbage collection operation and there is no need to buffer the new data until a subsequent timeout period. In this example, new data 1312 stored in scratch pad block 1206 are copied to update block E 1316, assuming that new data 1312 and 1314 belong to the same logical group.

Audio/Video Data

A host accessing data associated with audio/video files (hereinafter "audio/video data") stored in a non-volatile memory storage system may need to write the audio/video data at a pre-determined rate of speed when compared to other data. As the host streams the audio/video data to and/or from the non-volatile memory storage system, the bandwidth allocated to the stream matches or exceeds the pre-determined rate of speed. A garbage collection operation performed during the access of audio/video data can degrade the write performance of the audio/video data. Accordingly, in an embodiment, phased garbage collection is performed when the multiple sectors write command is not associated with audio/video data or the multiple sectors write command is at the beginning of an audio/video write.

To distinguish audio/video data from other data, in an embodiment, the non-volatile memory storage system can refer to the target logical address associated with the multiple sectors write command. Since audio/video data are written sequentially, a target logical address that is translated as a backwards jump can indicate that the new data are not audio/video data (or are the beginning of the audio/video data). In another embodiment, the non-volatile memory storage system can also distinguish audio/video data from other data by referring to the number of sectors associated with the new data. Audio/video data can be stored in units referred to as recording units. The minimum recording unit length associated with audio/video data can be 32 sectors. The number of sectors associated with new data that is not an integer multiple of 32 sectors can therefore indicate that the new data are not audio/video data. New data received that do not align to, or do not start at the beginning of a recording unit, also can indicate that the new data are not audio/video data.

As a result, phased garbage collection can be performed if one of the following conditions apply: (1) the multiple sectors write command invokes garbage collection operation; (2) the target logical address is translated as a backwards jump; (3) the target logical address is not aligned to a recording unit boundaries; and (4) after the stop command is received (i.e., end of the multiple sectors write command), if the number of sectors associated with the new data is not an integer multiple of 32.

Figure 15:
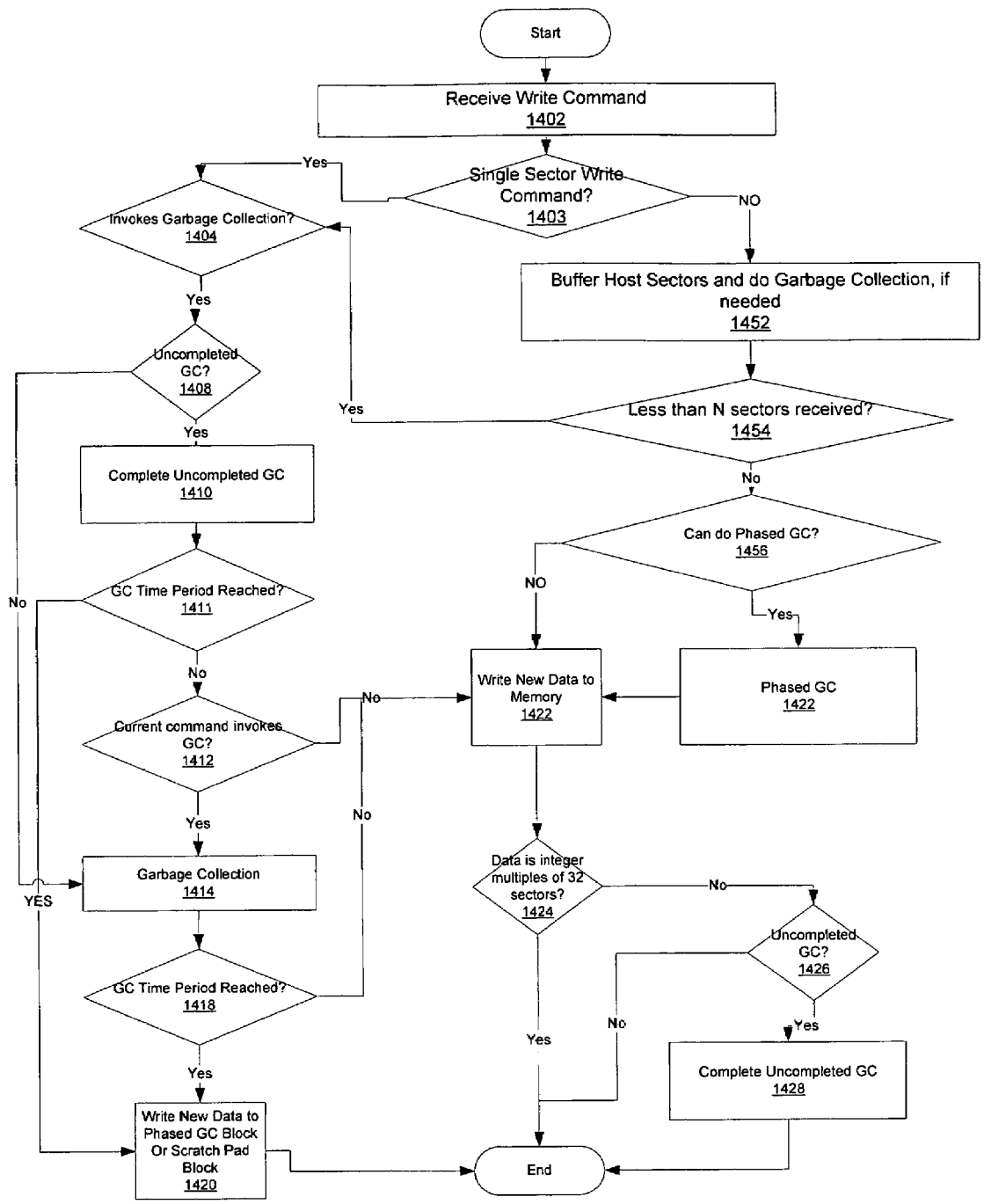
FIG. 15 is a flowchart diagram of non-volatile memory storage system operations associated with a write command, in accordance with an embodiment of the present invention.

FIG. 15 is a flowchart diagram of non-volatile memory storage system operations associated with a write command, in accordance with an embodiment of the present invention. The write command may be a single sector write command where new data are written as single sectors to random addresses across a memory cell array. Depending on host activity and card fragmentation, the host may write a long file with multiple sectors using single sector write commands to random locations. Since there is a limited number of update blocks allocated, these single sector writes can exercise the update blocks rapidly, thereby can prompt the non-volatile memory storage system to perform garbage collection operations to clear blocks for subsequent write operations. The write command may also be a multiple sectors write command. Most new data written to the memory cell array are large data files occupying a contiguous sequential logical address space. Depending on host activity, the host may write the large data files using multiple sectors write commands. Such new data comprises multiple sectors of new data with multiple timeout periods. FIG. 7 shows an example of a multiple sectors write command. In general, since multiple timeout periods are available with a multiple sectors write command, the new data can be written to an allocated update block instead of the scratch pad block. Therefore, the scratch pad block is usually not used as part of the phased garbage collection scheme in multiple write commands because the garbage collection can usually be completed within the multiple timeout periods allocated to the multiple sectors write command.

As shown in FIG. 15, a write command is received in operation 1402. Thereafter a determination is made in operation 1403 as to whether the write command is a single sector write command. If the write command is a single sector write command, a determination is made in operation 1404 as to whether the single sector write command invokes a garbage collection operation. If the single sector write command does not invoke a garbage collection operation, then the new data are written to the memory in operation 1422. On the other hand, if the write command does invoke a garbage collection operation, then another determination is made in operation 1408 as to whether a phased garbage collection is pending (i.e., a garbage collection operation that has already started, but was phased because the garbage collection could not be completed or if the phased garbage collection block is not empty). If there is phased garbage collection pending, then the phased garbage collection operation is continued or completed in operation 1410. In other words, the remaining portion from the previous garbage collection operation is continued. As shown in operation 1411, the phased garbage collection operation is performed until garbage collection time period (e.g., difference between timeout period and programming time) or until the phased garbage collection operation is completed.

If the phased garbage collection operation can be completed within garbage collection time period, then another determination is made in operation 1412 as to whether the write command still invokes a garbage collection operation, even after completing the phased garbage collection operation. If the write command does not invoke a garbage collection operation, then the new data are written to the memory in operation 1422. On the other hand, if the write command does invoke garbage collection, then a garbage collection operation is performed in operation 1414 until the garbage collection time period is reached in operation 1418 or until the phased garbage collection is completed. In an embodiment, if phased garbage collection block is used, then Equation 1.0 discussed above can be used as the garbage collection time period. If the phased garbage collection operation cannot be completed within the garbage collection time period, then the new data may be written to one of the phased garbage collection blocks in operation 1420. In another embodiment, if the scratch pad block is used, then Equation 2.0 discussed above can be used as the garbage collection time period in operation 1418. If the phased garbage collection operation cannot be completed within the garbage collection time period, then the new data may be written to the scratch block in operation 1420. If the phased garbage collection operation can be completed within the garbage collection time period, then the new data are written to the memory in operation 1422.

It should be noted that if there is a phased garbage collection and the current write command also invokes a garbage collection operation, then the garbage collection time period shown in operation 1418 is a continuation of the garbage collection time period in operation 1410. Accordingly, if there is a phased garbage collection and the current single sector write command invokes a garbage collection operation, then both operations are completed within the total garbage collection time period. In other words, the execution time allocated for phased garbage collection operations are shown in operation 1418 and garbage collection operation shown in operation 1410 can be, for example, the difference between the timeout period and the programming time.

After the new data are written to memory in operation 1422, a determination is made in operation 1424 as to whether the new data are integer multiples of 32 sectors. If the new data are integer multiples of 32 sectors, then the new data may be associated with audio/video data and the operation ends. However, if the new data are not integer multiples of 32 sectors, then a determination is made in operation 1426 as to whether a phased garbage collection is pending. If there is phased garbage collection pending, then the phased garbage collection operation is continued or completed in operation 1428. If there is no phased garbage collection pending, then the operation ends.

Returning to operation 1402, a multiple sectors write command may also be received. With a multiple sectors write command, the sectors of new data are stored (or buffered) and garbage collection operation can be performed in operation 1452, if needed. The non-volatile memory storage system may not utilize a scratch pad block or a phased garbage collection block to store new data in phased garbage collection operations because multiple timeout periods are allocated to the multiple sectors write command and one garbage collection operation can usually be completed by the end of the multiple sectors write command. Accordingly, instead of the scratch pad block, the non-volatile memory storage system may store the new data in RAM associated with the non-volatile memory storage system, or in other memories associated with the non-volatile memory storage system, while asserting the busy signals between sectors of new data in order to use the allocated timeout periods to perform garbage collection operations.

However, in an embodiment, the scratch pad block may be used in a multiple sectors write command if there are not enough timeout periods allocated to complete the garbage collection operation. Here, a determination can be made in operation 1454 as to whether less than N sectors of the new data are received. A multiple sectors write command with at least N sectors of new data can be written directly to the update blocks and not to the scratch pad block. Here, N is defined as $$N = RoundDown.to.Nearest.Integer\left[\frac{Tgc + TO}{TO}\right] \quad (3.0)$$

where TO is the timeout period and Tgc is the time period to perform one full garbage collection operation. Such multiple sectors write command can be written directly to the update blocks and not to the scratch pad block. Equation 3.0 shows that new data are written to the scratch pad block as part of the phased garbage collection scheme, when the write command is a single sector write command or when the non-volatile memory storage system receives less than N sectors of new data in a multiple sectors write command.

If less than N sectors are received, then the non-volatile memory storage system operates the multiple sectors write command in accordance with the single sector write command operations starting in operation 1404. However, if more than N sectors of new data are received, then a determination is made in operation 1456 as to whether a phased garbage collection operation can be performed. If no phased garbage collection operation can be performed, then the new data are written to memory in operation 1422. On the other hand, if a phased garbage collection can be performed, then a phased garbage collection operation is performed in operation 1422 until a time period of, for example, Tgc-Tprog. After the phased garbage collection operation, the new data are written to memory in operation 1422.

The above-described embodiments provide methods and/or systems for phased garbage collection. A garbage collection operation can be split into multiple phases and the multiple phases are performed over multiple timeout periods. In phased garbage collection, the new data received from the write command may be stored in a phased garbage collection block or a scratch pad block. By splitting the garbage collection operation, each phase of the garbage collection operation can be executed within the timeout period and thereby prevent timeout errors.

Although the foregoing embodiments have been described in some detail for purposes of clarity of understanding, the embodiments are not limited to the details provided. There are many alternative ways of implementing the embodiments. Accordingly, the disclosed embodiments are to be considered as illustrative and not restrictive, and the embodiments are not to be limited to the details given herein, but may be modified within the scope and equivalents of the appended claims. In the claims, elements and/or operations do not imply any particular order of operation, unless explicitly stated in the claims.

What is claimed is:

1. A method for operating a non-volatile memory system having a non-volatile memory, comprising:
   receiving a first write command to write a first plurality of data, the first write command being allocated a timeout period to complete an execution of the first write command;
   asserting a busy signal;
   copying a portion of a first plurality of valid data from one or more first blocks of the non-volatile memory to a second block of the non-volatile memory for a garbage collection time period;
   writing the first plurality of data to a first phased garbage collection block that spans a single logical group in the non-volatile memory;
   converting the phased garbage collection block to an update block of the non-volatile memory; and
   releasing the busy signal before the timeout period.

2. The method of claim 1, further comprising converting the first phased garbage collection block to an update block.

3. The method of claim 1, further comprising erasing the one or more first blocks.

4. The method of claim 1, wherein the copying the plurality of valid data from the one or more first blocks comprises:
   tracking a time for the copying the portion of the plurality of valid data from the one or more first blocks to the second block; and
   stopping the copying the portion of the plurality of valid data before the time exceeds the garbage collection time period.

5. The method of claim 1, wherein the first write command is a single sector write command.

6. The method of claim 1, wherein the garbage collection time period is a difference between the timeout period and a programming time associated with the writing the first plurality of data.

7. The method of claim 1, further comprising allocating a second phased garbage collection block that spans a second logical group, the second phased garbage collection block configured to store a second plurality of data from a second write command, the second write command being received after the first write command.

8. A method for operating a non-volatile memory system having a non-volatile memory, comprising:
   receiving a first write command to write a first plurality of data, the first write command being allocated a first timeout period to complete an execution of the first write command;
   asserting a first busy signal;
   copying a first portion of a plurality of valid data from one or more first blocks of the non-volatile memory to a second block of the non-volatile memory for a garbage collection time period;
   writing the first plurality of data to a phased garbage collection block that spans a single logical group in the non-volatile memory;

releasing the first busy signal before the first timeout period;
receiving a second write command to write a second plurality of data, the second write command being received after the receiving the first write command, the second write command being allocated a second timeout period to complete an execution of the second write command;
asserting a second busy signal;
copying a second portion of the plurality of valid data from the one or more first blocks to the second block for the garbage collection time period;
converting the phased garbage collection block to a first update block of the non-volatile memory;
writing the second plurality of data to the first update block; and
releasing the second busy signal before the second timeout period.

9. The method of claim 8, further comprising erasing the one or more first blocks.

10. The method of claim 8, further comprising:
allocating a fourth block; and
writing the second plurality of data to the fourth block.

11. The method of claim 10, further comprising copying a plurality of valid data from one or more fifth blocks to a sixth block for a remaining garbage collection time period.

12. The method of claim 11, wherein the plurality of valid data are copied from the one or more fifth blocks to the sixth block within the second timeout period.

13. The method of claim 8, wherein the first and second write commands are single sector write commands.

14. A method for operating a removable flash memory system having a flash memory in communication with a host via a host interface, comprising:
receiving a write command from the host via the host interface to write a plurality of data, the write command being allocated a timeout period to complete an execution of the write command;
asserting a busy signal to the host;
copying a portion of a plurality of valid data from one or more first blocks of the flash memory to a second block of the flash memory for a garbage collection time period;
writing the plurality of data to a phased garbage collection block that spans a single logical group in the flash memory;
converting the phased garbage collection block to an update block of the flash memory; and
releasing the busy signal before the timeout period.

15. The method of claim 14, wherein the write command is a single sector write command.

16. The method of claim 14, wherein the copying the portion of the plurality of valid data comprises:
tracking a time for the copying the portion of the plurality of valid data from the one or more first blocks to the second block; and
stopping the copying the portion of the plurality of valid data before the time exceeds the garbage collection time period.

17. The method of claim 14, wherein the garbage collection time period is a difference between the timeout period and a programming time associated with the writing the plurality of data.

18. A method for operating a removable flash memory system having a flash memory in communication with a host via a host interface, comprising:
receiving a first write command from the host via the host interface to write a first plurality of data, the first write command being allocated a first timeout period to complete an execution of the first write command;
asserting a first busy signal to the host;
copying a first portion of a plurality of valid data from one or more first blocks of the flash memory to a second block of the flash memory for a garbage collection time period;
writing the first plurality of data to a phased garbage collection block that spans a single logical group in the flash memory;
releasing the first busy signal before a timeout period;
receiving a second write command from the host via the host interface to write a second plurality of data, the second write command being received after the receiving the first write command, the second write command being allocated a second timeout period to complete an execution of the second write command;
asserting a second busy signal to the host;
copying a second portion of the plurality of valid data from the one or more first blocks to the second block for the garbage collection time period; and
releasing the second busy signal before the second timeout period converting the phased garbage collection block to an update block of the flash memory.

19. The method of claim 18, further comprising writing the second plurality of data to the scratch pad block.

20. The method of claim 18, further comprising writing the second plurality of data to an update block.

21. The method of claim 18, further comprising erasing the one or more first blocks after the copying the second portion of the plurality of valid data.

22. The method of claim 21, wherein the one or more first blocks are erased if the second portion of the plurality of valid data is a last portion of the plurality of valid data.

23. The method of claim 18, further comprising:
allocating an update block; and
copying the first plurality of data from the scratch pad block to the update block.

24. The method of claim 18, wherein the first and second write commands are single sector write commands.

* * * * *